(12) United States Patent
Akagi et al.

(10) Patent No.: US 6,590,729 B1
(45) Date of Patent: Jul. 8, 2003

(54) MAGNETIC DISK DRIVE WITH SERVO SIGNAL DECODER USING AMPLITUDE DETECTION AND PHASE DETECTION SYSTEM

(75) Inventors: Kyo Akagi, Fuchu (JP); Yosuke Seo, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/680,470

(22) Filed: Oct. 6, 2000

(30) Foreign Application Priority Data

Oct. 8, 1999 (JP) .......................................... 11-288458

(51) Int. Cl.[7] .............................................. G11B 5/09
(52) U.S. Cl. ..................................... 360/48; 360/77.08
(58) Field of Search ............................... 360/49, 77.08, 360/51

(56) References Cited

U.S. PATENT DOCUMENTS

| 4,549,232 A | | 10/1985 | Axmear et al. | |
| 5,343,340 A | | 8/1994 | Boutaghou et al. | |
| 5,717,538 A | * | 2/1998 | Cheung et al. | 360/77.08 |
| 5,991,104 A | * | 11/1999 | Bonyhard | 360/15 |
| 6,049,438 A | * | 4/2000 | Serrano et al. | 360/49 |

FOREIGN PATENT DOCUMENTS

| JP | 4732012 | 8/1992 |
| JP | 6010472 | 1/1994 |
| JP | 6231552 | 8/1994 |
| JP | 9251736 | 9/1997 |

* cited by examiner

*Primary Examiner*—Regina N. Holder
(74) *Attorney, Agent, or Firm*—Antonelli, Terry, Stout & Kraus, LLP

(57) ABSTRACT

Disclosed are a method and a device that exhibit better performance against factors inhibiting an increase in track density than the current system. A servo pattern is constituted of a plurality of patterns arranged on both sides of the center lines of tracks, the patterns on one side of the center line being shifted in the track direction from the patterns on the other side along the center line, and patterns A and B are each constituted of two types of phase patterns arranged in the track-width direction, which are patterns 11 and 12 and patterns 13 and 14, respectively. The positional signal of a magnetic head is decoded by determining a sinusoidal function, which roughly agrees with the waveform of the reproduced signal of the servo pattern, based on the information on the frequency of the reproduced signal which has been stored in advance.

18 Claims, 14 Drawing Sheets

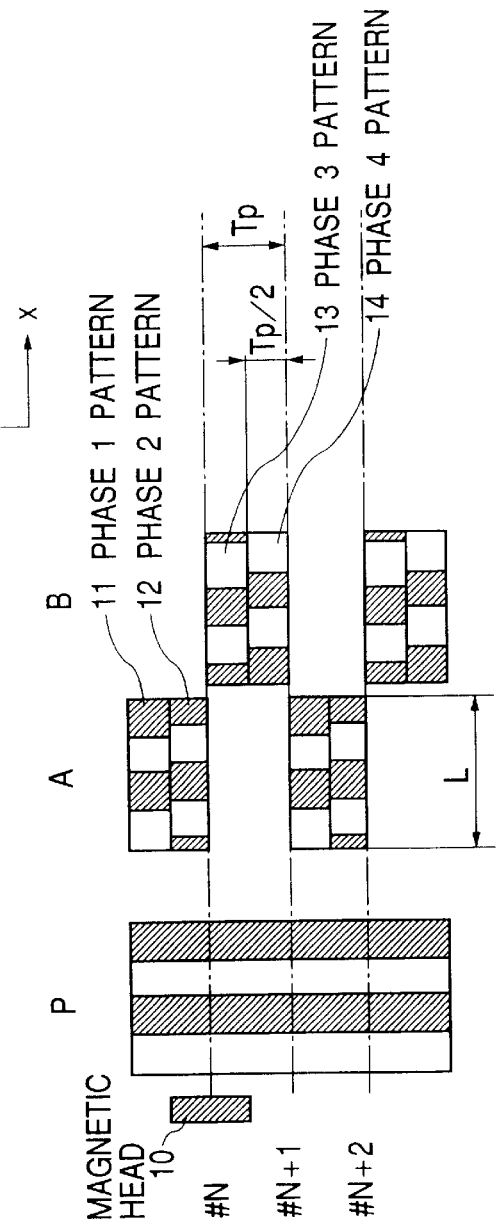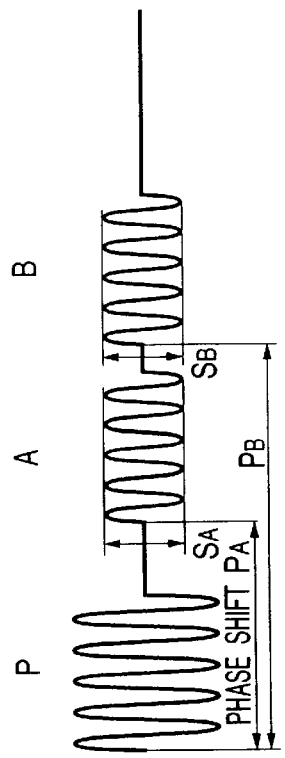

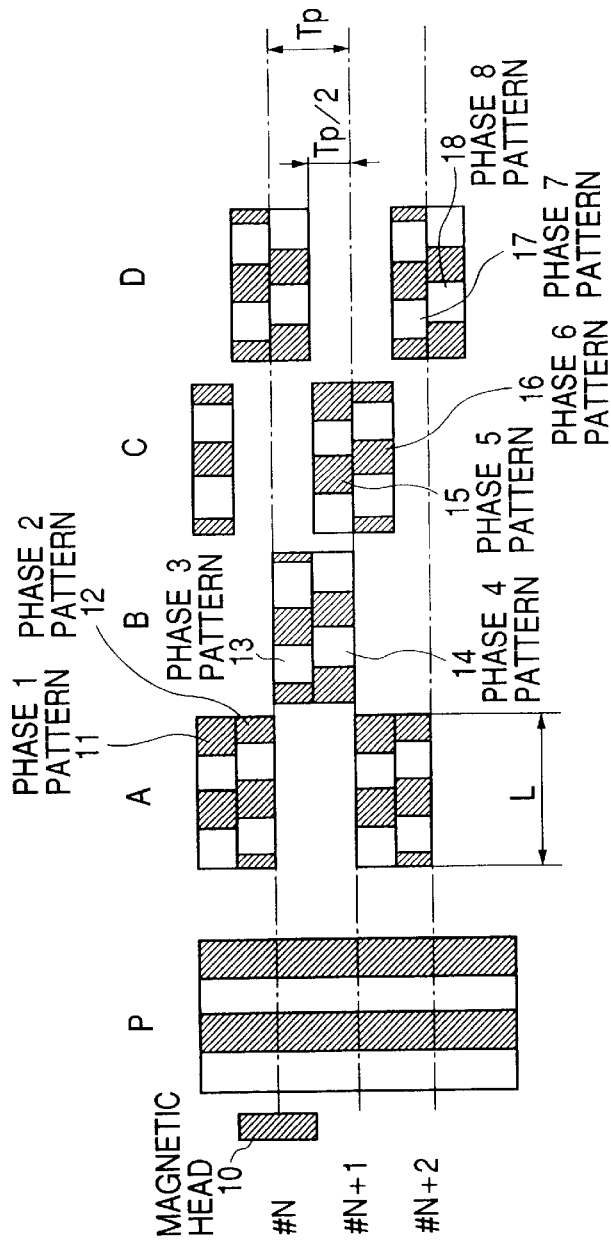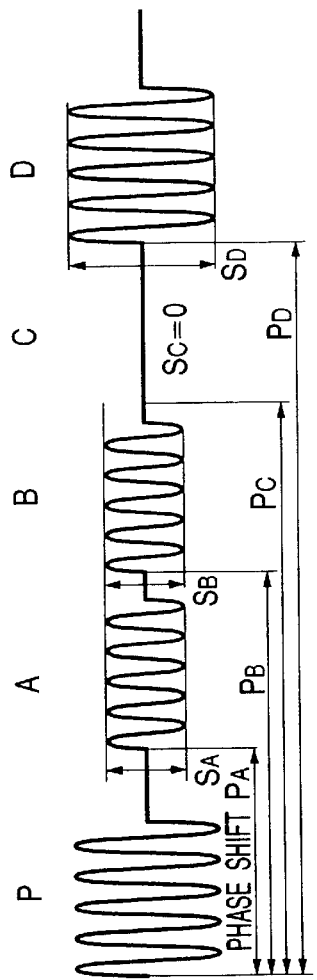

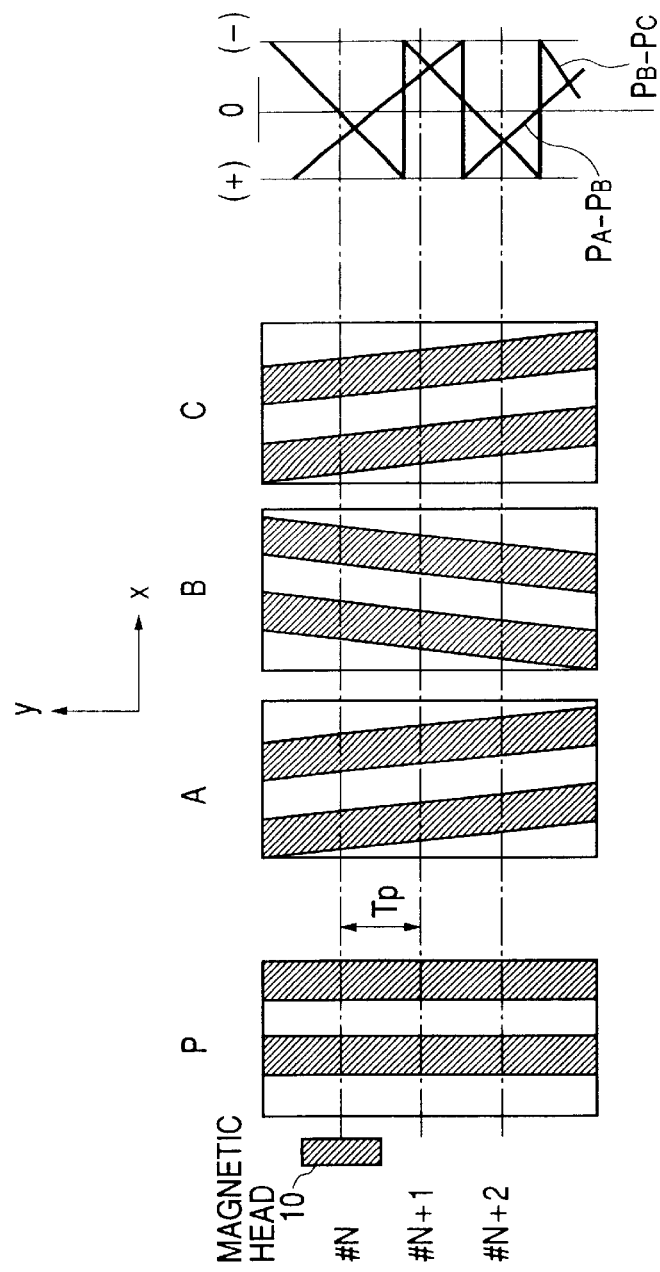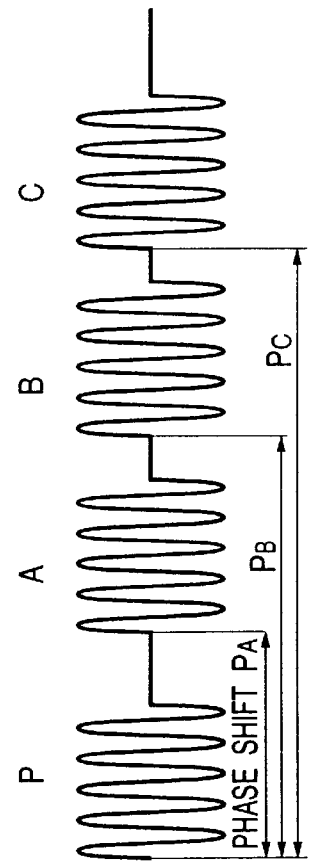
FIG. 3(a) PRIOR ART
FIG. 3(b) PRIOR ART

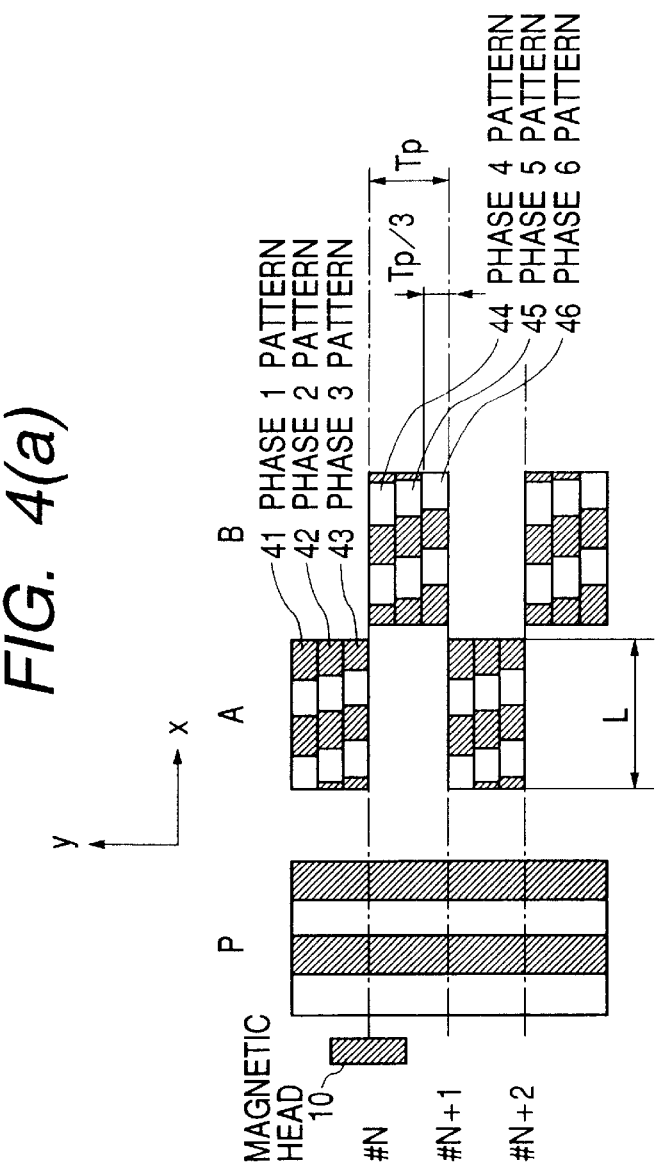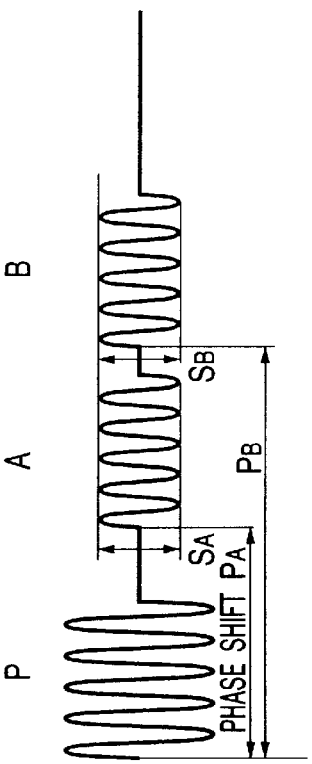

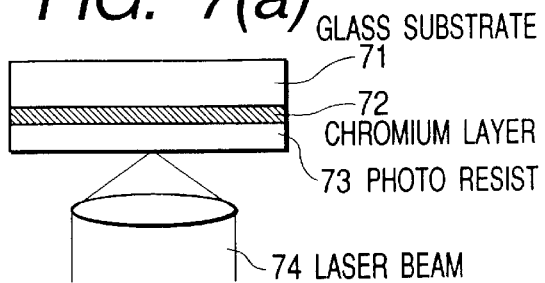
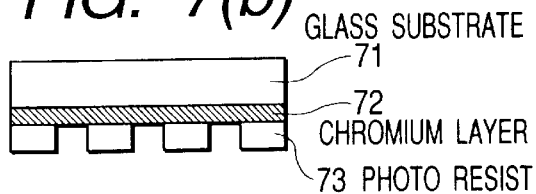
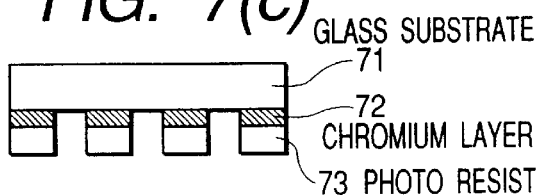
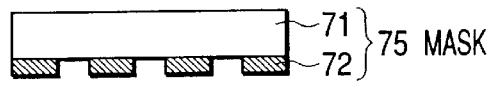
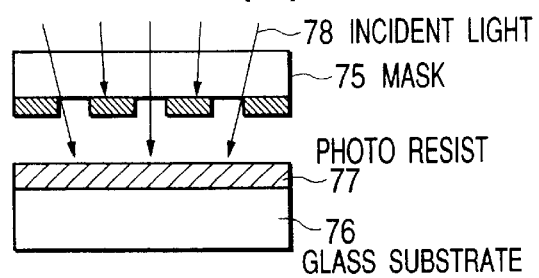
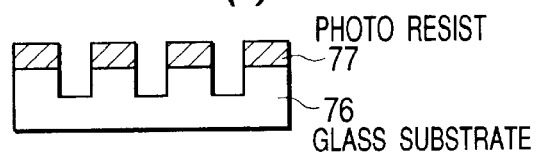
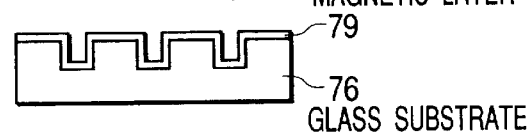
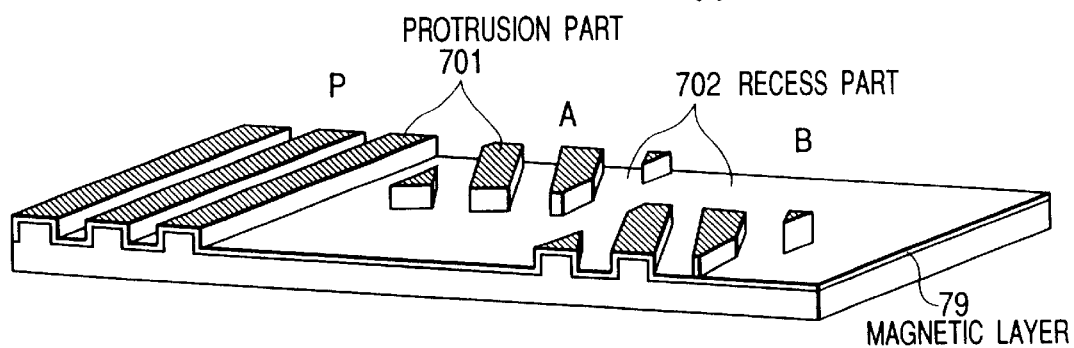

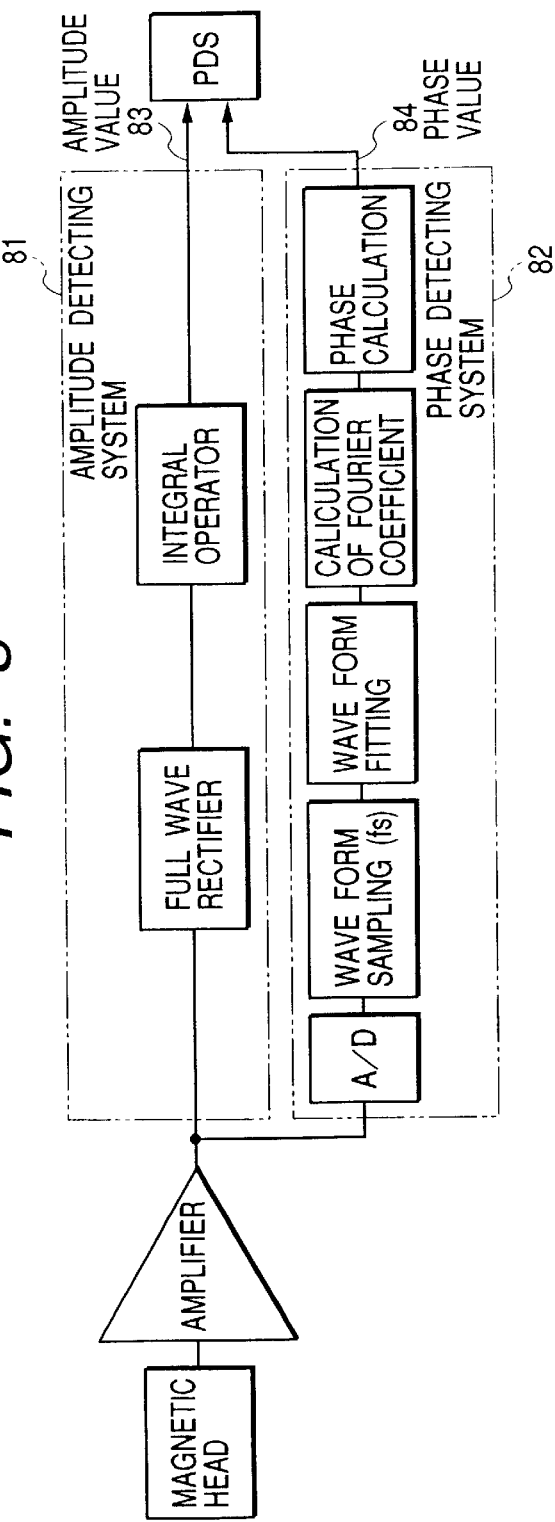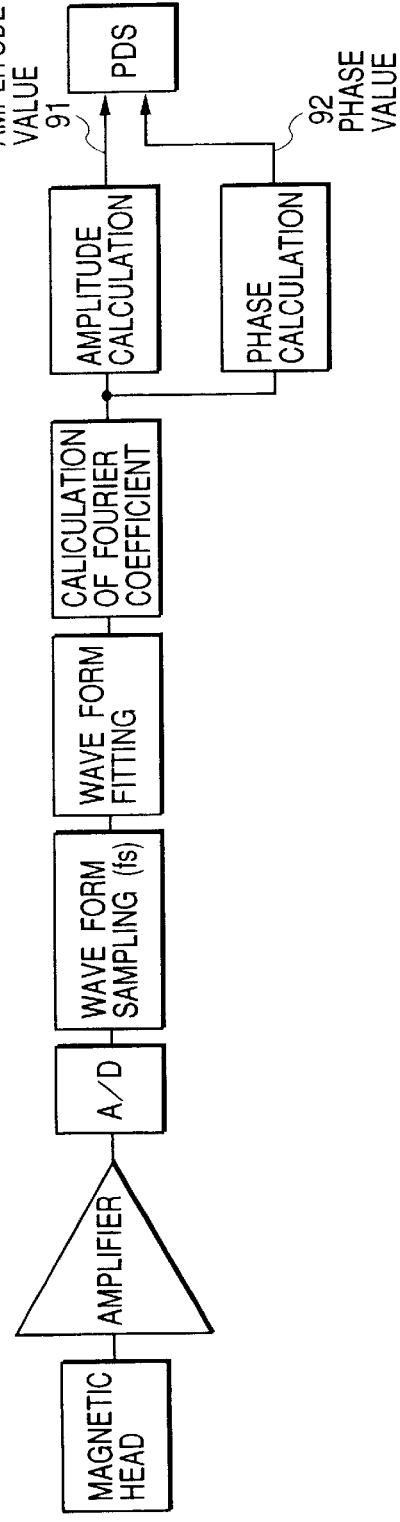

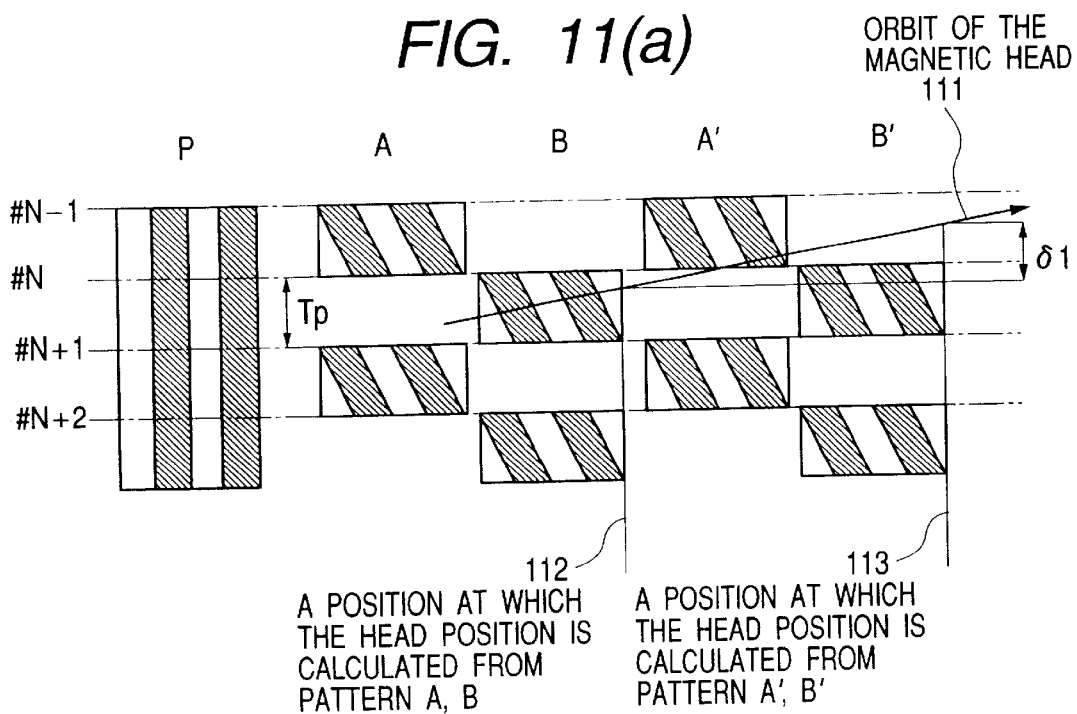
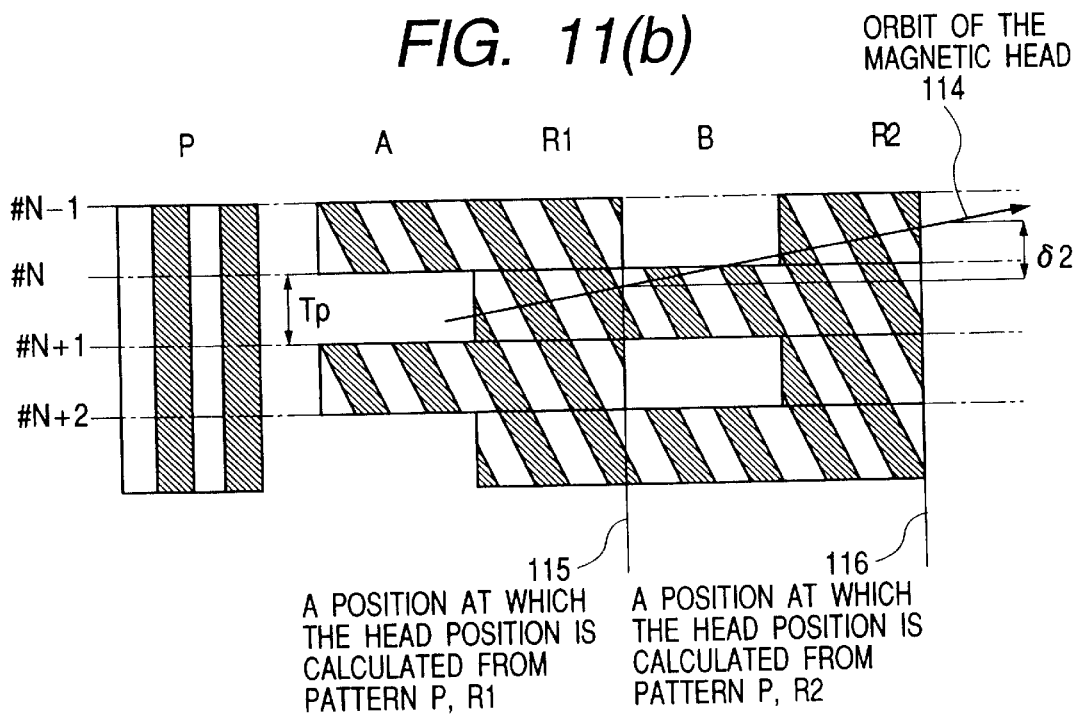

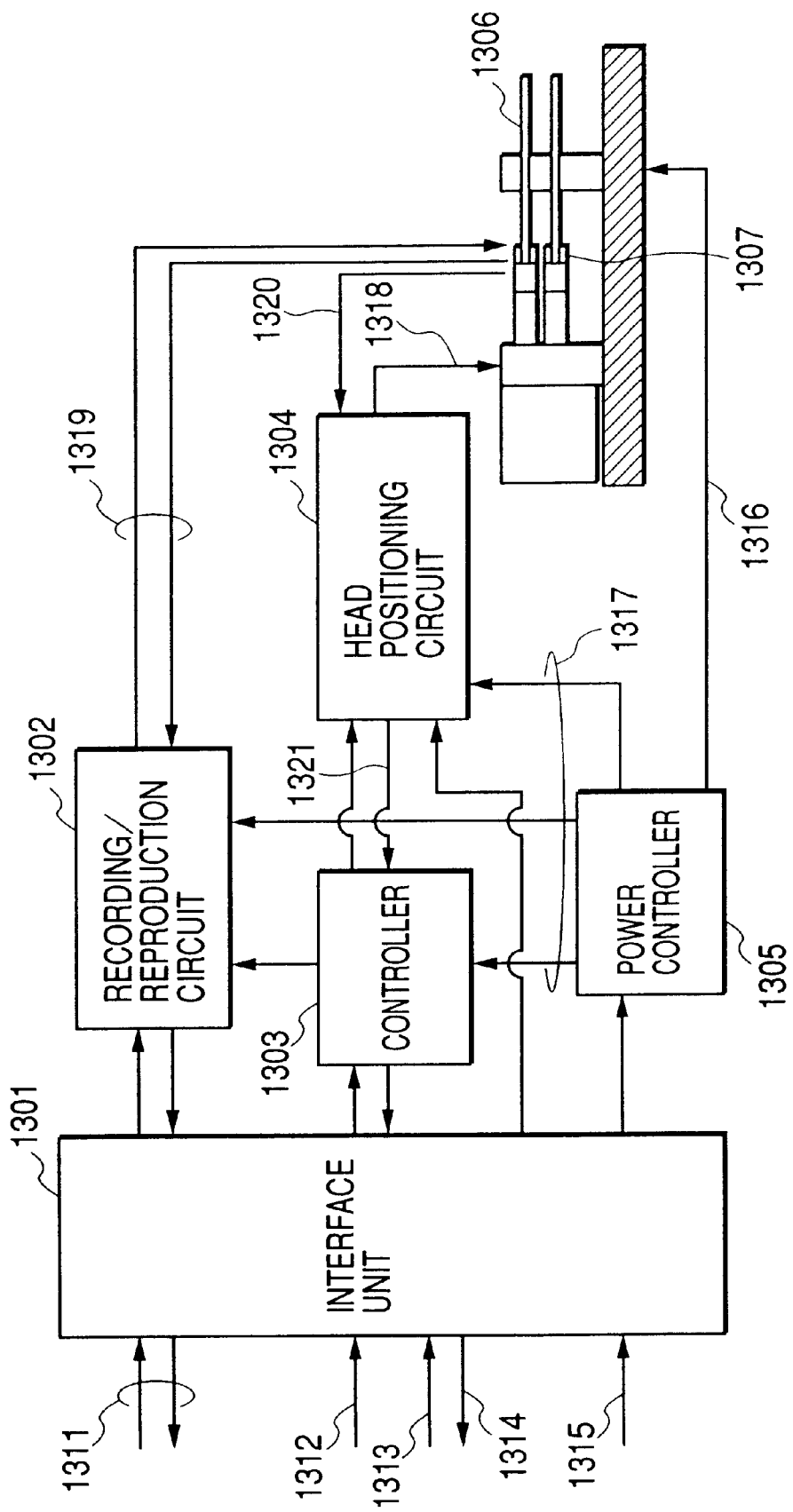

MAGNETIC DISK DRIVE WITH SERVO SIGNAL DECODER USING AMPLITUDE DETECTION AND PHASE DETECTION SYSTEM

BACKGROUND OF THE INVENTION

1. Field of the Invention

The present invention relates to a magnetic disk drive, more specifically to a magnetic disk drive such as a flexible magnetic disk drive and a rigid magnetic disk drive which acquires information for positioning a magnetic head from a reproduced signal of a servo pattern recorded on a magnetic disk.

2. Description of the Related Art

The most general servo pattern used for positioning a magnetic head of a magnetic disk drive comprises servo bits which are arranged in a staggered layout along the centerline, and a method for positioning (tracking) a magnetic head is known, in which difference between each of the servo bits amplitude is generated to acquire the information on the position in the track-width direction, as described in Japanese Patent Publication No. 47-32012.

FIGS. 2(a) and 2(b) are diagrams illustrating the outline of the conventional "amplitude-detecting servo" system. FIG. 2(a) is a diagram showing the relationship between tracks and a servo pattern, and FIG. 2(b) is a diagram showing an example of reproduced signals obtained from a magnetic head moving on the servo pattern. The case of positioning a magnetic head 10 having a track width of $T_{wr}$ on the track #N is considered. As shown in FIG. 2(a), when the magnetic head 10 moves in the direction x in the drawing and passes on patterns P and A to D, the reproduced signals as shown in FIG. 2(b) are obtained. The white and black portions of each of the patterns P and A to D show that the direction of magnetization on the portions of one color of the servo pattern recorded on a magnetic recording medium is opposite to the direction of magnetization on the portions of the other color. That is, in the case of longitudinal recording, the directions of magnetization on the white and black portions are vectors pointing to the opposite directions to each other which have track-direction (x-direction) components in the surface of a medium, while in the case of perpendicular recording, the directions of magnetization on the white and black portions are vectors pointing to the opposite directions to each other which have components perpendicular to the surface of the medium. The pattern of FIG. 2(a) is schematic and actually agrees with the signal period of FIG. 2(b).

When a difference between the amplitude $S_A$ of the reproduced signal of the pattern A and the amplitude $S_B$ of the reproduced signal of the pattern B, $S_A - S_B$, is calculated and the magnetic head 10 is caused to move in the track-width direction y, the calculation results in N-POS signal as shown on the right side of FIG. 2(a). Similarly, when a difference between the amplitude $S_C$ of the reproduced signal of the pattern C and the amplitude $S_D$ of the reproduced signal of the pattern D, $S_C - S_D$, is calculated and the magnetic head 10 is caused to move in the track-width direction y, the calculation results in Q-POS signal as shown on the right side of FIG. 2(a). By using the above calculated N-POS and Q-POS signals of desired portions as positional signals, the current position of the magnetic head 10 can be known.

Meanwhile, as a servo system different from the above servo system, the so-called "phase-detecting servo" system is disclosed, for example, in Japanese Patent Laid-Open No. 60-10472. FIGS. 3(a) and 3(b) are diagrams illustrating the outline of the conventional "phase-detecting servo" system. The case of positioning the magnetic head 10 having a track width of $T_{wr}$ on the track #N is considered. When the magnetic head 10 moves in the direction x and passes on patterns P and A to C shown in FIG. 3(a), the reproduced signals as shown in FIG. 3(b) are obtained, for example. The representation of the white and black portions of each of the patterns P and A to C is the same as that of FIG. 2. The patterns are at azimuth angles with respect to the magnetic head 10. Since these angles are too small to make the degradation (azimuth loss) in the reproduced signal a problem, the shapes of the reproduced signals of the patterns are not so different from those of FIG. 2(b). However, the phases of the patterns A, B and C relative to the pattern P vary depending on the position of the magnetic head 10 in the track-width direction y. The phases of the patterns A, B and C on the track #N are defined as $P_A$, $P_B$ and $P_C$, respectively. The pattern of FIG. 3(a) is schematic and actually agrees with the signal period of FIG. 3(b).

When the phase shifts $P_B - P_A$ and $P_C - P_B$ are calculated, an example of the results of the calculations is shown on the right side of FIG. 3(a). By using the above calculated $P_B - P_A$ and $P_C - P_B$ signals appropriately as positional signals, the current position of the magnetic head 10 can be known. As a method for obtaining the phases $P_A$, $P_B$ and $P_C$ from the reproduced signals of FIG. 3(b), a method which is disclosed in Japanese Patent Laid-Open No. 6-231552 can be employed, for example.

Further, an example of an amplitude pattern in combination with a method comprising detecting a phase change by distorting the waveform is disclosed in Japanese Patent Laid-Open No. 9-251736. This pattern records a pattern which includes not only the characteristic properties of the conventional amplitude pattern but also the change-with-time property that a portion of a waveform changes while another portion does not. Because of this pattern, the patterns C and D of FIG. 2(a) can be omitted.

Along with an increase in the track density of a magnetic disk drive, a variety of technical factors or factors associated with the production of the magnetic disk drive come to the surface as the factors inhibiting the increase in the track density. Of such factors, geometrical factors ascribed to the track width of a magnetic head and the shape of a servo pattern appears in the form of non-linearity in a positional signal. This includes the effect of a difference between a geometrical track width and an effective track width in a recording pattern in the track-width direction. Further, as for noise in a recording medium or reproduction circuit system, it can be gradually recognized as a relative reduction in signal-to-noise ratio (S/N) relative to the reproduced signal. Further, as for disturbance, the track density can reach its limit when the error for track following control exceeds a margin.

Further, as for the prior art in which the method for detecting a change in a portion of a waveform with time by distorting the waveform is employed together with the amplitude pattern, it has such a defect that as a result of distorting the waveform, other harmonic content is produced other than the harmonic content in the fundamental wave or the waveform before distortion, thereby decoding noise increases.

The present invention has been invented in view of the above points, and the object of the present invention is to provide a method and a device that exhibit better performance against the above factors inhibiting the increase in the track density than that of the current system.

BRIEF SUMMARY OF THE INVENTION

To solve the above problems, in the present invention, the information on the servo pattern or on the position for positioning a magnetic head is multiplexed. That is, the improvement of positioning accuracy is intended by acquiring both the information on the amplitude and the information on the phase from the servo pattern simultaneously and using them effectively while having them complement each other.

It has been recognized that the non-linearity in the positional signal is caused by the mismatch between the width of the servo pattern and the track width of a reproducing head, particularly in the amplitude-detecting system. However, the positions where the non-linearity is liable to occur are limited to some local portions. Thus, by acquiring the information on the phase which is not susceptible to non-linearity together with the information on the amplitude and using the two types of information while having them complement each other, the problem of the non-linearity in the positional signal can be avoided.

As for noise in the positional signal, by using the information on the amplitude and the information on the phase in combination, the amount of information can be further increased and the S/N can be greatly improved.

As for disturbance, by acquiring the information on the velocity of the head in the track-width direction from the information on the phase while detecting the information on the position, a recording process can be terminated at an early stage, for example, when the disturbance is severe.

As means for acquiring the information on the amplitude from the reproduced waveform of the servo pattern, there is available a method in which the above signal is subjected to full-wave rectification, followed by an integral operation. The thus obtained result (amplitude value) reflects the amplitude value of the reproduced signal of the servo pattern. As another means, these is available a method in which the information on the reproduced waveform of the servo pattern is collected discretely and the information is expressed by means of the Fourier polynomial expression. This method will be described in detail hereinafter. As means for acquiring the information on the phase from the reproduced waveform of the servo pattern, there is used a method in which the information on the reproduced waveform of the servo pattern is collected discretely and the information is expressed by means of the Fourier polynomial expression, as has just been described above. The method will be described in detail hereinafter.

The above reproduced waveform of the servo pattern is a repetition of a predetermined waveform over several cycles. The number of waveforms to be sampled discretely per cycle (number of oversampling) is defined as N, and the number of the above repetition of a positional signal waveform P(n) is defined as L. n is the number of the waveform-sampling point. The P(n) can be expressed as the following [EQUATION 1] by the Fourier polynomial expression. It is necessary to determine the frequency of sampling (discrete sampling) according to the frequency of the waveform to be sampled. In other words, a servo signal decoder circuit originally has the information on the frequency of the waveform as the sampling frequency.

$$P(n) = A_0 + \left[ \sum_{m=1}^{\frac{N}{2}-1} \left\{ A_m \cdot \cos\left(\frac{2 \cdot n \cdot \pi \cdot m}{N}\right) + B_m \cdot \sin\left(\frac{2 \cdot n \cdot \pi \cdot m}{N}\right) \right\} \right]$$ [EQUATION 1]

wherein $A_0$, $A_m$ and $B_m$ are discrete Fourier coefficients and m is the order of discrete Fourier transformation. The above Fourier polynomial is uniquely determined once the discrete Fourier coefficients are determined.

The Fourier coefficients, when the sampling data on the reproduced waveform of the pattern is defined as f(n), are determined by the following [EQUATION 2], [EQUATION 3] and [EQUATION 4].

$$A_0 = \frac{1}{L \cdot N} \sum_{n=0}^{L \cdot N - 1} f(n)$$ [EQUATION 2]

$$A_m = \frac{2}{L \cdot N} \sum_{n=0}^{L \cdot N - 1} f(n) \cdot \cos\left(\frac{2 \cdot n \cdot \pi \cdot m}{N}\right)$$ [EQUATION 3]

$$B_m = \frac{2}{L \cdot N} \sum_{n=0}^{L \cdot N - 1} f(n) \cdot \sin\left(\frac{2 \cdot n \cdot \pi \cdot m}{N}\right)$$ [EQUATION 4]

In the most simple case, the desired result can be obtained by determining the Fourier coefficients $A_1$ and $B_1$ when the order is 1 (m is 1). In the case of amplitude detection, the amplitude value is determined by the following [EQUATION 5], while in the case of phase detection, the phase shift from the base pattern is determined by the following [EQUATION 6].

$$\sqrt{(A_1)^2 + (B_1)^2}$$ [EQUATION 5]

$$\arctan\left(\frac{B_1}{A_1}\right)$$ [EQUATION 6]

A servo signal decoder circuit can determine the amplitude of a partial signal by integrating the partial signal and its phase from the phase of the above sinusoidal function. Alternatively, the servo signal decoder circuit can determine the amplitude and phase of the partial signal from the amplitude and phase of the above sinusoidal function. The servo signal decoder circuit preferably decodes the positional signal of the magnetic head by weighting the information obtained from the amplitude and the information obtained from the phase differently.

By using the above processes, the information on the amplitude and the information on the phase can be obtained simultaneously from the decoded waveform. As compared with the conventional method in which only the partial information of a waveform is obtained, the amount of information on decoding increases, and the number of opportunities to use it effectively also increases. Consequently, according to the process of the present invention for multiplexing the information on the servo pattern or on the position, a variety of problems ascribed to the above increase in the track density can be solved.

That is, the magnetic disk drive according to the present invention is a magnetic disk drive comprising a magnetic recording medium having a servo pattern, a magnetic head that writes information on and reads the information from the magnetic recording medium, and a servo signal decoder circuit that decodes the positional signal of the magnetic head from the reproduced signal of the servo pattern, in which the reproduced signal of the servo pattern comprises a plurality of partial signals whose amplitudes and phases change simultaneously according to the position in the track-width direction of the magnetic disk, and the servo signal decoder circuit decodes the positional signal of the magnetic head by determining a sinusoidal function, which roughly agrees with each of the partial signals, based on the information on the frequency of the reproduced signal which has been stored therein in advance.

The servo signal decoder circuit can determine the amplitude of a partial signal by integrating the partial signal and its phase from the phase of the above sinusoidal function.

Alternatively, the servo signal decoder circuit can determine the amplitude and phase of the partial signal from the amplitude and phase of the above sinusoidal function. The servo signal decoder circuit preferably decodes the positional signal of the magnetic head by weighting the information obtained from the amplitude and the information obtained from the phase differently.

Further, the velocity vector of the magnetic head can be obtained by using the positional signals of the magnetic head which are at two distinct positions away from each other at a given distance in the track direction.

Once the velocity vector in the head-moving direction is found, it becomes possible to estimate whether the head is on a given track, at the data position before the next servo sector. By using this information, when jumping over tracks is expected by the shock or vibration caused by external sources during a writing process, the destruction of the data on adjacent tracks can be prevented beforehand by preventing the writing process.

Further, the magnetic disk drive according to the present invention is a magnetic disk drive comprising a magnetic recording medium having a servo pattern, a magnetic head that writes information on and reads the information from the magnetic recording medium, and a servo signal decoder circuit that decodes the positional signal of the magnetic head from the reproduced signal of the servo pattern, in which the servo pattern includes a plurality of patterns arranged on both sides of the center lines of tracks, the patterns on one side of the center line being shifted in the track direction from the patterns on the other side along the center line, and the plurality of patterns, each including two different types of phase patterns arranged in the track-width direction. This servo pattern can be easily created by the current servo track writer. The pattern-writing time is also the same as that of the conventional servo pattern.

Further, the magnetic disk drive according to the present invention is a magnetic disk drive comprising a magnetic recording medium having a servo pattern, a magnetic head that writes information on and reads the information from the magnetic recording medium, and a servo signal decoder circuit that decodes the positional signal of the magnetic head from the reproduced signal of the servo pattern, in which the servo pattern includes a plurality of patterns arranged on both sides of the center lines of tracks, the patterns on one side of the center line being shifted in the track direction from the patterns on the other side along the center line, and the plurality of patterns, each including N (N is a positive number of 3 or more) different types of phase patterns arranged in the track-width direction. This servo pattern can be easily created by the current servo track writer.

Further, the magnetic disk drive according to the present invention is a magnetic disk drive comprising a magnetic recording medium having a servo pattern, a magnetic head that writes information on and reads the information from the magnetic recording medium, and a servo signal decoder circuit that decodes the positional signal of the magnetic head from the reproduced signal of the servo pattern, in which the servo pattern includes a plurality of patterns arranged on both sides of the center lines of tracks, the patterns on one side of the center line being shifted in the track direction from the patterns on the other side along the center line, and the plurality of patterns, each being a pattern whose phase in the track direction changes continuously in the track-width direction.

Further, the magnetic disk drive according to the present invention is a magnetic disk drive comprising a magnetic recording medium having a servo pattern and divided into a plurality of zones in the track-width direction, a magnetic head that writes information on and reads the information from the magnetic recording medium, and a servo signal decoder circuit that decodes the positional signal of the magnetic head from the reproduced signal of the servo pattern, in which the reproduced signal of the servo pattern includes a plurality of partial signals whose amplitudes and phases change simultaneously according to the position in the track-width direction of the magnetic head, the frequency of the reproduced signal of the servo pattern varies from one zone to another, and the servo signal decoder circuit decodes the positional signal of the magnetic head by determining a sinusoidal function, which roughly agrees with each of the partial signals, based on the information on the frequency of the reproduced signal of the servo pattern which has been read out of each zone. The frequency of the reproduced signal of the servo pattern may vary not from one zone to another but from one track to another.

BRIEF DESCRIPTION OF THE SEVERAL VIEWS OF THE DRAWINGS

FIGS. 1(*a*) and 1(*c*) are schematic diagrams showing an example of a servo pattern according to the present invention, and FIGS. 1(*b*) and 1(*d*) are examples of its reproduced waveform.

FIGS. 3(*a*) and 3(*b*) are diagrams illustrating the outline of the conventional "phase-detection servo" system.

FIGS. 4(*a*) and 4(*b*) are schematic diagrams showing an example of the servo pattern according to the present invention and an example of its reproduced waveform.

FIGS. 7(*a*) to 7(*i*) are diagrams illustrating another exemplary method for forming the servo pattern according to the present invention.

FIG. 8 is a block diagram showing an example of a servo signal decoder circuit.

FIG. 9 is a block diagram showing another example of the servo signal decoder circuit.

FIGS. 11(*a*) and 11(*b*) are diagrams illustrating a method for detecting the velocity vector of a magnetic head.

FIG. 14 is a functional block diagram illustrating an example of the internal circuits of the magnetic disk unit.

Figure 2A:
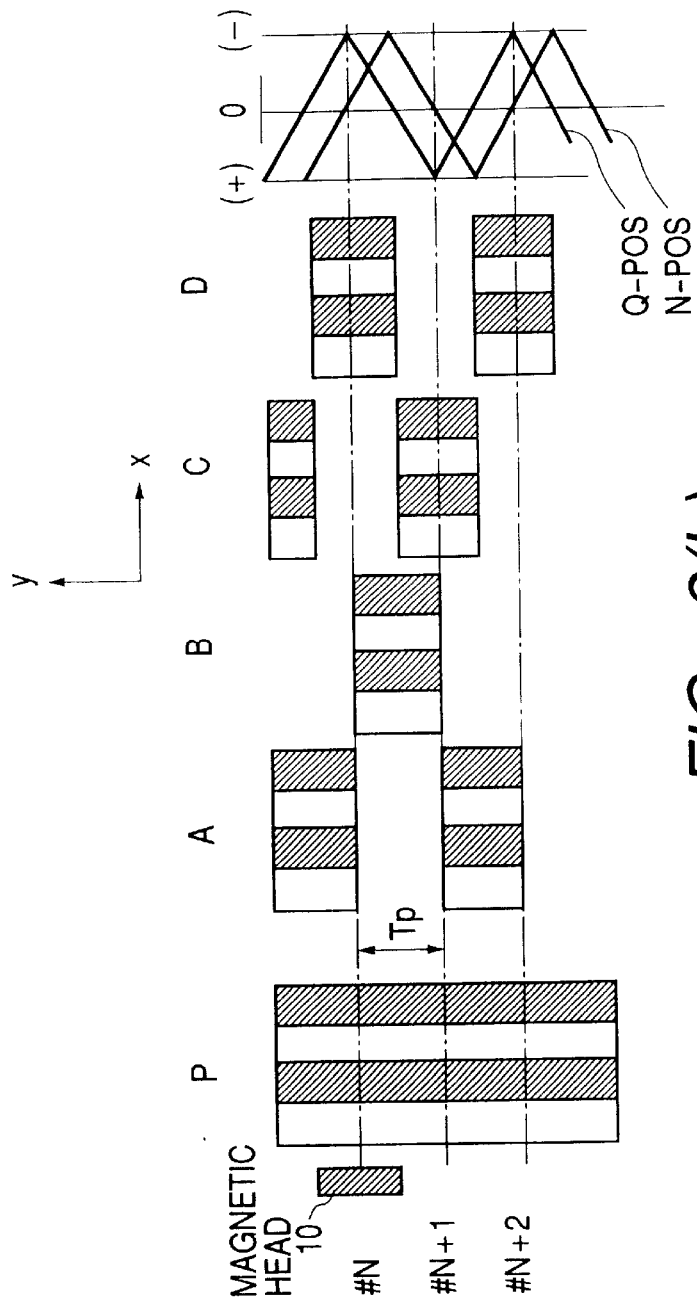
FIGS. 2(*a*) and 2(*b*) are diagrams illustrating the outline of the conventional "amplitude-detection servo" system.
Figure 2B:
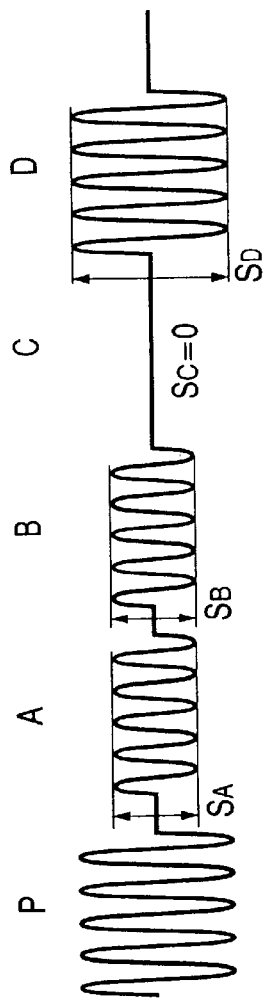

Reference numeral 10 denotes a magnetic head, 11 a "phase 1" pattern, 12 a "phase 2" pattern, 13 a "phase 3" pattern, 14 a "phase 4" pattern, 15 a "phase 5" pattern, 16 a "phase 6" pattern, 17 a "phase 7" pattern, 18 a "phase 8" pattern, 41 a "phase 1" pattern, 42 a "phase 2" pattern, 43 a "phase 3" pattern, 44 a "phase 4" pattern, 45 a "phase 5" pattern, 46 a "phase 6" pattern, 61 a magnetic disk drive, 62 a spindle motor, 63 a magnetic disk, 64 a voice coil motor, 65 an arm, 66 a magnetic head, 67 an arm, 68 a servo patter write head, 601 a servo pattern, 602 an orbit of the write head, 71 a glass substrate, 72 a chromium layer, 73 a photoresist, 74 a laser beam, 75 a mask, 76 a glass substrate, 77 a photoresist, 78 incident light, 79 a magnetic layer, 701 a protrusion part, 702 a recess part, 81 an amplitude detecting system, 82 a phase detecting system, 83 an amplitude value, 84 a phase value, 91 an amplitude value, 92 a phase value, 111 an orbit of the magnetic head, 112 a position at which the head position is calculated from patterns A and B, 113 a position at which the head position is calculated from patterns A' and B', 115 a position at which the head position is calculated from pattern R1, 116 a position at which the head position is calculated from pattern R2, 121 a PLL part, 122 an address mark, 123 a cylinder number, 124 a servo mark, 125 data, 131 a magnetic head, 132 an arm, 133 a head actuator, 134 a magnetic disk, 135 a disk spindle, 136 a spindle motor, 137 a base, 138 a cover, 139 a circuit board, 1301 an interface unit, 1302 a recording/reproduction circuit, 1303 a controller, 1304 a head positioning circuit, 1305 a power controller, 1306 a magnetic disk, 1307 a magnetic head, 1311 information on magnetic data, 1312 a control signal, 1313 information on address, 1314 information on status, 1315 power, 1316 driving the spindle, 1317 driving each circuit, 1318 information on servo, 1319 information on recording/reproduction, 1320 information on position and velocity, and 1321 information on control.

DETAILED DESCRIPTION OF THE INVENTION

The embodiments of the present invention will be described with reference to the drawings hereinafter.

FIG. 1(a) is a schematic diagram showing an example of the servo pattern according to the present invention, and FIG. 1(b) is a schematic diagram of its reproduced waveform. In FIG. 1(a) showing the servo pattern, the x-axis direction is the reading-writing direction of a magnetic head 10 and the y-axis direction is the track-width direction of the magnetic head 10. In this example, at least patterns A and B are arranged in a staggered layout in the x-axis direction and the same patterns are recorded in the y-axis direction as shown in FIG. 1(a). As required, a pattern P is continuously recorded in the y-axis direction.

Next, a description will be given to the constitution of each of the patterns. The pattern A comprises a "phase 1" pattern 11 whose frequency is f and width in the y-axis direction is a half of the track pitch Tp and a "phase 2" pattern 12 whose frequency is f and width is Tp/2, the patterns 11 and 12 being arranged side by side in the y-axis direction. A waveform having periodicity such as all 1 is recorded. The pattern length L is sufficient to record at least two cycles of the above waveform. The pattern B, which is arranged in a staggered layout for the pattern A relative to the center line of the track #N, comprises a "phase 3" pattern 13 whose frequency is f and width in the y-axis direction is a half of the track pitch Tp and a "phase 4" pattern 14 whose frequency is f and width is Tp/2, the patterns 13 and 14 being arranged side by side in the y-axis direction. The waveform and pattern length of the pattern B is the same as those of the pattern A. The pattern P has a frequency of f and the same waveform as those of the above patterns 11 to 14. The phase of the pattern P may or may not agree with any of the "phase 1" to the "phase 4". The above phases 1 to 4 must be continuous at the same intervals. That is, it is desirable that the phase shift between the phase 1 and the phase 2, that between the phase 2 and the phase 3, that between the phase 3 and the phase 4, and that between the phase 4 and the phase 1 be all the same.

FIG. 1(b) shows an example of a waveform reproduced from the magnetic head 10 when the magnetic head 10 moves on the track #N of the patterns shown in FIG. 1(a). The reproduced waveforms of the patterns P, A and B are, in an ideal condition, sinusoidal waveforms free from a waveform distortion. Phase shifts $P_A$ and $P_B$ are the phase shifts between the reproduced waveform of the pattern A and that of the pattern P and the phase shift between the reproduced waveform of the pattern B and that of the pattern P, respectively, and the information on the phase between the reproduced waveform of the pattern A and that of the pattern B can also be obtained by calculating the difference between $P_A$ and $P_B$ such as $P_A - P_B$. In other words, the information on the phase can be directly, that is, without the pattern P involved, obtained as the phase shift of the reproduced waveform of the pattern B from that of the pattern A. In this case, the pattern P is not necessary. In this case, however, the phase interval between the above phases 1 and 2 and that between the phases 3 and 4 must be somehow changed, for example.

Further, as the improved version of the servo pattern shown in FIG. 1(a), patterns C and D may be placed at the same positions as shown in FIG. 2(a), in addition to the patterns A and B, as shown in FIG. 1(c). In this case, the phases of the patterns 15 and 16 constituting the pattern C are "phase 5" and "phase 6", respectively. Similarly, the phases of the patterns 17 and 18 constituting the pattern D are "phase 7" and "phase 8", respectively. The "phase 5", "phase 6", "phase 7" and "phase 8" may or may not agree with the "phase 1", "phase 2", "phase 3" and "phase 4", respectively.

FIG. 1(d) shows an example of a waveform reproduced from the magnetic head 10 when the magnetic head 10 moves on the track #N of the patterns shown in FIG. 1(c). The reproduced waveforms of the patterns P, A, B, C and D are, in an ideal condition, a sinusoidal waveform free from a waveform distortion. The phase shifts $P_A$, $P_B$, . . . are the phase shifts between the reproduced waveform of the pattern A, B, . . . and that of the pattern P, respectively, and the information on the phase between the reproduced waveform of one pattern and that of another pattern can also be obtained by calculating the difference between them such as $P_A - P_B$. In other words, the information on the phase can be directly, that is, without the pattern P involved, obtained as the phase shift between the reproduced waveforms of the two patterns. In this case, the pattern P is not necessary. In this case, however, the phase intervals among the above phases 1 to 4 and those among the phases 5 to 8 must be somehow changed, for example.

FIG. 4(a) is a schematic diagram showing another example of the servo pattern according to the present invention, and FIG. 4(b) is a schematic diagram of its reproduced waveform. FIG. 4(a) shows the servo pattern, its x-axis direction is the reading-writing direction of the magnetic head 10 and its y-axis direction is the track-width direction of the magnetic head 10. In this example, at least patterns A and B are arranged in a staggered layout in the x-axis direction and the same patterns are recorded in the y-axis direction as shown in FIG. 4(a). As required, the pattern P is continuously recorded in the y-axis direction.

The pattern A comprises a "phase 1" pattern 41 whose frequency is f and width in the y-axis direction is a third of the track pitch Tp, a "phase 2" pattern 42 whose frequency is f and width is Tp/3, and a "phase 3" pattern 43 whose frequency is f and width is Tp/3, the patterns 41, 42 and 43 being arranged side by side in the y-axis direction. A waveform having periodicity such as all 1 is recorded. The pattern length L is sufficient to record at least two cycles of the above waveform. The pattern B, which is arranged in a staggered layout for the pattern A relative to the center line of the track #N, comprises a "phase 4" pattern 44 whose frequency is f and width in the y-axis direction is a third of the track pitch Tp, a "phase 5" pattern 45 whose frequency is f and width is Tp/3, and a "phase 6" pattern 46 whose frequency is f and width is Tp/3, the patterns 44, 45 and 46 being arranged side by side in the y-axis direction. The waveform and pattern length of the pattern B is the same as those of the pattern A. The pattern P has a frequency of f and the same waveform as those of the above patterns 41 to 46. The phase of the pattern P may or may not agree with any of the "phase 1" to the "phase 6". The above phases 1 to 6 must be continuous at the same intervals. That is, it is necessary that the phase shift between the phase 1 and the phase 2, that between the phase 2 and the phase 3, that between the phase 3 and the phase 4, that between the phase 4 and the phase 5, that between the phase 5 and the phase 6, and that between the phase 6 and the phase 1 be all the same.

FIG. 4(b) shows an example of a waveform reproduced from the magnetic head 10 when the magnetic head 10 moves on the track #N of the patterns shown in FIG. 4(a). The reproduced waveforms of the patterns P, A and B are, in an ideal condition, a sinusoidal waveform free from a waveform distortion. The phase shifts $P_A$ and $P_B$ are the phase shift between the reproduced waveform of the pattern A and that of the pattern P and the phase shift between the reproduced waveform of the pattern B and that of the pattern P, respectively, and the information on the phase between the reproduced waveform of the pattern A and that of the pattern B can also be obtained by calculating the difference between $P_A$ and $P_B$ such as $P_A - P_B$ In other words, the information on the phase can be directly, that is, without the pattern P involved, obtained as the phase shift of the reproduced waveform of the pattern B from that of the pattern A. In this case, the pattern P is not necessary. In this case, however, the phase intervals among the above phases 1, 2 and 3 and those among the phases 4, 5 and 6 must be somehow changed, for example.

Further, as the improved version of this servo pattern, patterns C and D may be additionally placed at the positions after the patterns A and B in the x-axis direction, as shown in FIG. 1(c).

The servo pattern shown in FIG. 4(a) can be said to be a servo pattern divided into three portions in the track-width direction (y-axis direction), while the servo pattern shown in FIG. 1(a) can be said to be a servo pattern divided into two portions. From this point of view, the above servo patterns can be generally expressed as a servo pattern divided into N portions (N is a natural number) in the track-width direction.

When N becomes a substantially large number, the servo pattern is almost equivalent to the servo pattern that will be described with reference to FIG. 5(a).

Figure 5A:
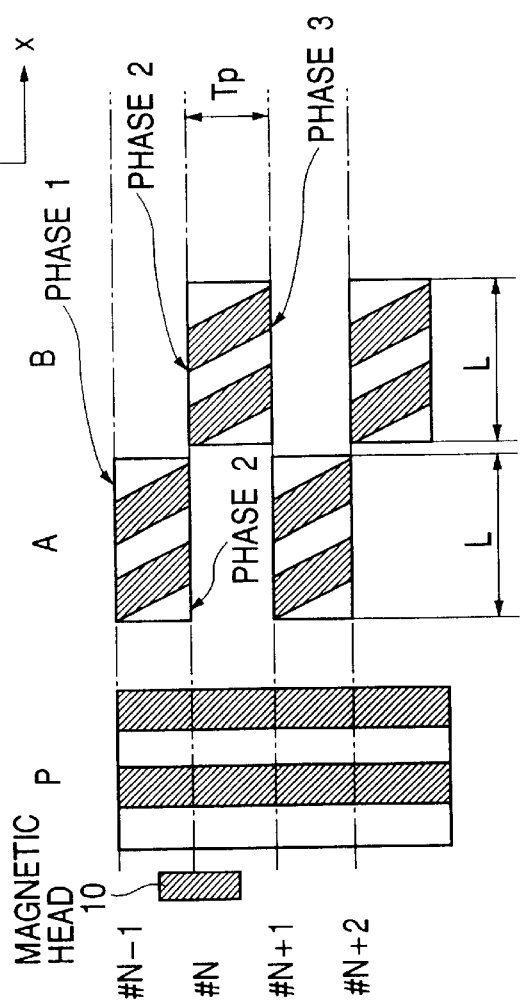
FIGS. 5(*a*) and 5(*b*) are schematic diagrams showing another example of the servo pattern according to the present invention and an example of its reproduced waveform.
Figure 5B:
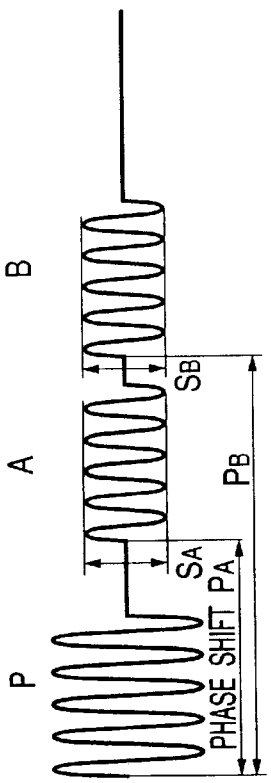

FIG. 5(a) is a schematic diagram showing another example of the servo pattern according to the present invention, and FIG. 5(b) is a schematic diagram of its reproduced waveform. FIG. 5(a) shows the servo pattern, its x-axis direction is the direction of the magnetic head 10 and its y-axis direction is the track-width direction of the magnetic head 10. In this example, at least patterns A and B are arranged in a staggered layout in the x-axis direction and the same patterns are recorded in the y-axis direction as shown in FIG. 5(a). As required, the pattern P is continuously recorded in the y-axis direction.

The pattern A is a pattern with a frequency of f whose phase changes continuously according to the position in the y-axis direction, that is, a "phase 1" at the #N−1 track position and a "phase 2" at the #N track position. The width of the pattern in the y-axis direction is equal to the track pitch Tp. The pattern length L is sufficient to record at least two cycles of the above waveform. The pattern B, which is arranged in a staggered layout for the pattern A relative to the center line of the track #N, is a pattern with a frequency of f whose phase changes continuously according to the position in the y-axis direction, that is, a "phase 2" at the #N track position and a "phase 3" at the #N+1 track position. The width of the pattern in the y-axis direction is equal to the track pitch Tp. The pattern length L is sufficient to record at least two cycles of the above waveform. The pattern P has a frequency of f and the same sinusoidal waveform as those of the above patterns A and B. The phase of the pattern P may or may not agree with any of the "phase 1" to the "phase 3". The above phases 1 to 3 must be continuous at the same intervals. That is, the phase of the pattern A changes consistently from the phase 1 to the phase 2, and the phase of the pattern B changes consistently from the phase 2 to the phase 3.

FIG. 5(b) shows an example of a waveform reproduced from the magnetic head 10 when the magnetic head 10 reads the patterns on the track #N of the patterns shown in FIG. 5(a). The reproduced waveforms of the patterns P, A and B are, in an ideal condition, a sinusoidal waveform free from a waveform distortion. The phase shifts $P_A$ and $P_B$ are the phase shift between the reproduced waveform of the pattern A and that of the pattern P and the phase shift between the reproduced waveform of the pattern B and that of the pattern P, respectively, and the information on the phase between the reproduced waveform of the pattern A and that of the pattern B can also be obtained by calculating the difference between $P_A$ and $P_B$ such as $P_A - P_B$. In other words, the phase information can be directly, that is, without the pattern P involved, obtained as the phase shift of the reproduced waveform of the pattern B from that of the pattern A. In this case, the pattern P is not necessary. In this case, however, the phase interval from the phase 1 to the phase 2 of the pattern A and that from the phase 2 to the phase 3 of the pattern B must be somehow changed, for example.

Further, as the improved version of the servo pattern shown in FIG. 5(a), patterns C and D similar to the patterns A and B may be placed at the positions after the patterns A and B in the x-axis direction, as shown in FIG. 1(c).

Figure 6A:
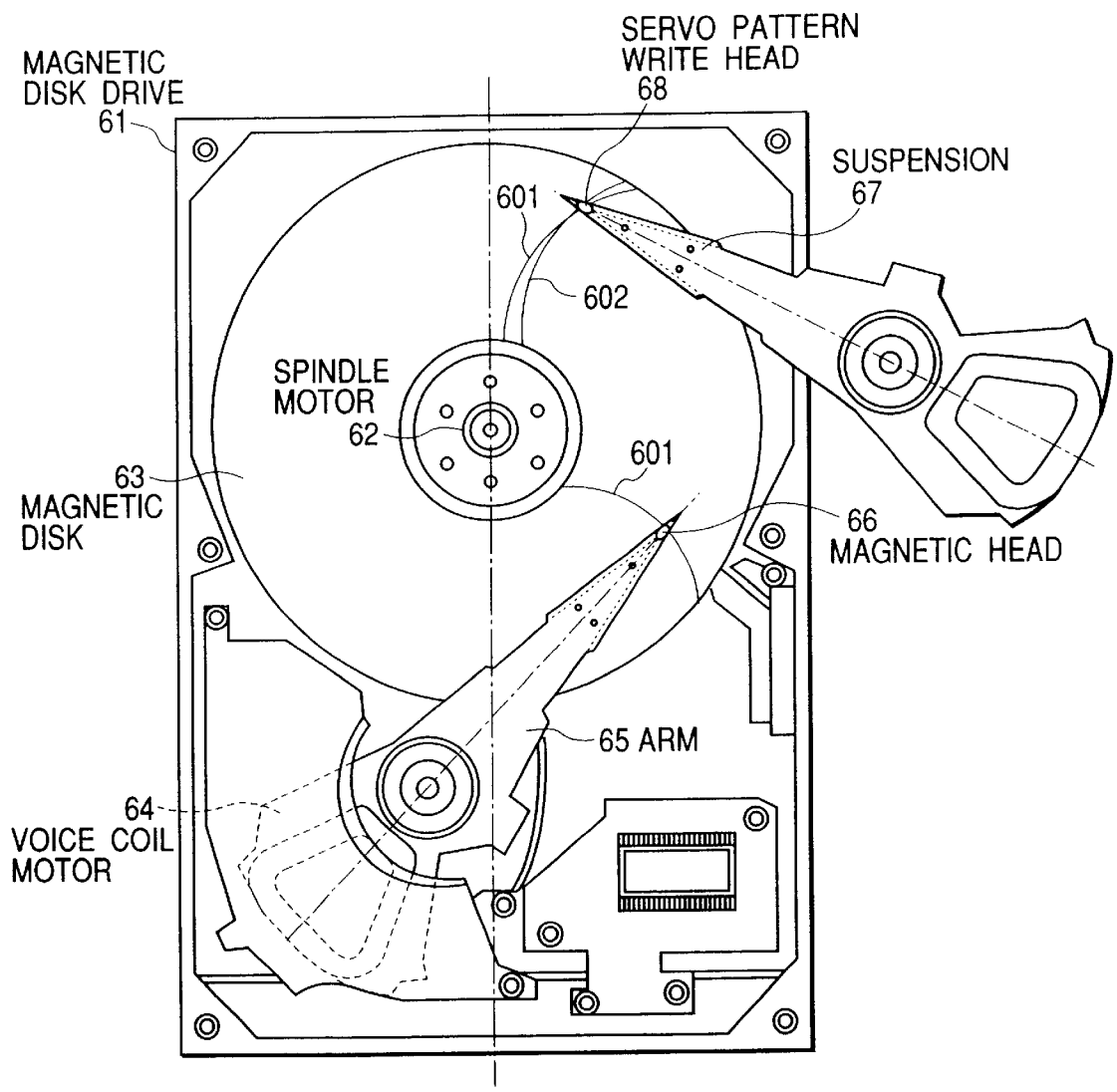
FIGS. 6(*a*) and 6(*b*) are diagrams illustrating one exemplary method for recording the servo pattern shown in FIG. 5(*a*).
Figure 6B:
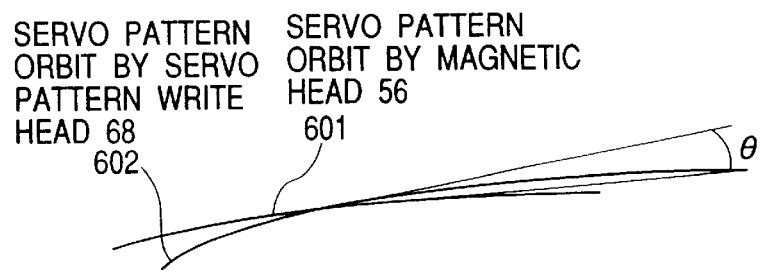

FIG. 6 is a diagram illustrating one exemplary method for recording the servo pattern shown in FIG. 5(a). FIG. 6(a) is a plan view of a magnetic disk drive. FIG. 6(b) is a diagram illustrating the servo pattern orbit recorded by the magnetic head installed in the magnetic disk drive and the servo pattern orbit recorded by a servo pattern write head for exclusive use.

A magnetic disk drive 61 comprises a magnetic disk 63, which is spun and driven by a spindle motor 62, and a magnetic head 66, which is driven by a voice-coil-motor (VCM) 64 via an arm 65. Generally, a servo pattern orbit 601 by the magnetic head is recorded in the form of an arc by the magnetic head 66 as shown in FIG. 6(*a*). A variety of length-measuring methods and head-moving methods in recording the servo pattern orbit, though not specifically illustrated, are available, and an example of such methods is a method which comprises driving the head 66 while the absolute position of the arm 65 is measured by irradiating a portion of the arm 65 with a laser beam.

To record the servo pattern shown in FIG. 5(*a*), a servo pattern write head 68 is used in addition to the magnetic head 66. The servo pattern write head 68 is supported by an arm 67 and positioned such that the orbit 602 by the write head forms an angle of θ with the servo pattern orbit by the head 66 (FIG. 6(*b*)). While the head 66 and the head 68 are synchronized with the servo signal, a desired pattern is formed by recording the pattern P shown in FIG. 5(*a*) by the head 66 and the patterns A and B by the head 68, for example.

FIGS. 7(*a*) to 7(*i*) are diagrams illustrating another exemplary method for forming the servo pattern according to the present invention. The servo pattern-forming method described herein, unlike the aforementioned method for forming the servo pattern by magnetically recording by a magnetic head, uses a lithography technique to form the servo pattern. In FIGS. 7(*a*) to 7(*h*), the formation process is shown schematically by sectional views of a magnetic disk and, in FIG. 7(*i*), a perspective view of the servo pattern obtained after the completion of the process is shown. This method can be applied to any of the servo patterns shown in FIGS. 1, 4 and 5.

In FIGS. 7(*a*) to 7(*d*), firstly, a mask for transferring the servo pattern on a magnetic disk is formed. As shown in FIG. 7(*a*), laser cutting is conducted in the form of a desired servo pattern by a laser beam 74 on the photoresist-coated surface of a mask substrate obtained by coating a glass substrate 71 with a chromium layer 72 and then with a photoresist 73. This step can be conducted by using a cutting machine for cutting a stamper such as a compact disk and the like. Then, as shown in FIG. 7(*b*), the resulting substrate is developed and subjected to chromium etching. Portions where the photoresist 73 no longer exists after the developing step of FIG. 7(*b*) are etched as shown in FIG. 7(*c*). By eventually removing the photoresist 73 by a remover, the desired mask 75 as shown in FIG. 7(*d*) is obtained.

Next, in FIGS. 7(*e*) to 7(*h*), a process of transferring the servo pattern on the substrate by using the above mask 75 to form a magnetic disk having the servo pattern is shown. The glass substrate 76 shown in FIG. 7(*e*) is a substrate material for the magnetic disk and has a photoresist 77 coated thereon. The substrate 76 is irradiated with incident light 78 through the above mask 75 to transfer the pattern of the mask 75 onto the photoresist 77. When the resulting substrate is developed and etched by reactive ion etching, recesses and protrusions reflecting the mask pattern are formed on the surface of the glass substrate 76, as shown in FIG. 7(*f*). The photoresist was removed from the substrate as shown in FIG. 7(*g*), followed by sputtering a magnetic layer 79 thereon, to obtain the magnetic disk shown in FIG. 7(*h*).

In FIG. 7(*i*), the top views (views from above) of the patterns P, A and B are the same as those shown in FIG. 5(*a*). However, in the perspective view of FIG. 7(*i*), black portions of the pattern of FIG. 5(*a*) are formed as protrusions 701, while white portions of the pattern of FIG. 5(*a*) are formed as recesses 702. In the case of a magnetic disk having such a sectional shape, when a magnetic field is applied in one direction along the surface of the disk, for example, the surface becomes magnetized such that a spacial magnetic field emerges from the corners of the recesses and protrusions, thereby functioning as the servo pattern like the magnetization pattern shown in FIG. 5(*a*).

Although the mask-forming process has been described with reference to FIG. 7, it is also possible to produce a similar magnetic disk by preparing a stamper such as a compact disk and producing a disk substrate by subjecting the stamper to an injection molding process. Further, although FIG. 7(*e*) illustrates projection exposure, mask-contact exposure in which the mask and the disk substrate are in contact with each other may be employed. Furthermore, although a laser beam is used for cutting in FIG. 7(*a*), a shortwave beam such as an electron beam may also be used from the viewpoint of the fineness of the pattern. Although the process of transforming the pattern onto the magnetic disk via the mask has been described above, it is also possible to coat a magnetic disk with a resist or the like, which is then directly cut by a laser beam.

FIG. 8 is a block diagram showing an example of a servo signal decoder circuit that acquires the positional signal of a magnetic head by decoding the reproduced signal of a servo pattern. The reproduced signal of the servo pattern reproduced by the magnetic head goes through an amplifier, and one of the amplified signals is sent to an amplitude-detecting system 81 and another is sent to a phase-detecting system 82. In the amplitude-detecting system 81, the above signal is subjected to full-wave rectification, followed by an integral operation. The thus obtained result 83 (amplitude value) reflects the amplitude value of the reproduced signal of the servo pattern. The reproduced signal sent to the amplitude-detecting system 81 may be a post-A/D digital signal and, in this case, a digital integral operation may be carried out without the full-wave rectification involved.

In the phase-detecting system 82, after A/D conversion, waveform sampling and waveform fitting are carried out to calculate Fourier coefficients, on the basis of which the phase value 84 of the waveform is determined. Specifically, a waveform is sampled, for example, by eight-times-oversampling for a wavelength of the above reproduced signal. In this case, it is necessary to determine in advance a sampling frequency fs according to the frequency of the waveform to be sampled. In other words, the servo signal decoder circuit originally has the information on the frequency of the waveform as the sampling frequency fs. Then, waveform fitting is carried out by using discrete Fourier series to calculate Fourier coefficients. The calculation of a phase value is carried out by using the obtained Fourier coefficients. As a result, the phase value 84 of the waveform is obtained. The calculation in the phase-detecting system will be described in detail hereinafter. The number of waveforms to be sampled discretely per cycle (number of oversampling) is set to be 8, and the above frequency of a positional signal waveform p(n) is set to be 10. n is the number of the waveform-sampling point. When the p(n) is to be expressed by means of the Fourier polynomial expression, it can be expressed as the following [EQUATION 7].

$$p(n) = A_0 + \left[\sum_{m=1}^{3}\left\{A_m \cdot \cos\left(\frac{n \cdot \pi \cdot m}{4}\right) + B_m \cdot \sin\left(\frac{n \cdot \pi \cdot m}{4}\right)\right\}\right]$$ [EQUATION 7]

wherein $A_0$, $A_m$ and $B_m$ are discrete Fourier coefficients and m is the order of discrete Fourier transformation. It is clear that the above Fourier polynomial is uniquely determined once the discrete Fourier coefficients are determined. The Fourier coefficients $A_0$, $A_m$ and $B_m$, when the sampling data on the reproduced waveform of the pattern is defined as f(n), are determined by [EQUATION 8], [EQUATION 9] and [EQUATION 10].

$$A_0 = \frac{1}{80}\sum_{n=0}^{79} f(n)$$ [EQUATION 8]

$$A_m = \frac{1}{40}\sum_{n=0}^{79} f(n) \cdot \cos\left(\frac{n \cdot \pi \cdot m}{4}\right)$$ [EQUATION 9]

$$B_m = \frac{1}{40}\sum_{n=0}^{79} f(n) \cdot \sin\left(\frac{n \cdot \pi \cdot m}{4}\right)$$ [EQUATION 10]

In the most simple case, the desired result can be obtained by determining the Fourier coefficients $A_1$ and $B_1$ when the order is 1 (m is 1). In the case of phase detection, the phase shift from the base pattern is determined by the following [EQUATION 11].

$$\arctan\left(\frac{B_1}{A_1}\right)$$ [EQUATION 11]

FIG. 9 is a block diagram showing another example of a servo signal decoder circuit that acquires the positional signal of a magnetic head by decoding the reproduced signal of a servo pattern. The reproduced signal of the servo pattern reproduced by the magnetic head goes through an amplifier and an A/D converter, and the waveform is sampled, for example, by eight-times-oversampling for a wavelength of the reproduced signal. In this case, it is necessary to determine in advance a sampling frequency fs according to the frequency of the waveform to be sampled. In other words, the servo signal decoder circuit originally has the information on the frequency of the waveform as the sampling frequency fs. Then, waveform fitting is carried out using discrete Fourier series to calculate Fourier coefficients.

The amplitude value and phase value of the waveform are calculated by using the obtained Fourier coefficients, and as a result, an amplitude value 91 and a phase value 92 are obtained. More specifically, the Fourier coefficients are calculated by going through a series of calculations from the above [EQUATION 7] to [EQUATION 10]. In the most simple case, the desired result can be obtained by determining the Fourier coefficients $A_1$ and $B_1$ when the order is 1 (m is 1). In the case of amplitude detection, the amplitude value 91 is determined by the following [EQUATION 12], while in the case of phase detection, the phase shift 92 from the base pattern is determined by [EQUATION 11].

$$\sqrt{(A_1)^2 + (B_1)^2}$$ [EQUATION 12]

Figures 10A, 10B, 10C, 10D:
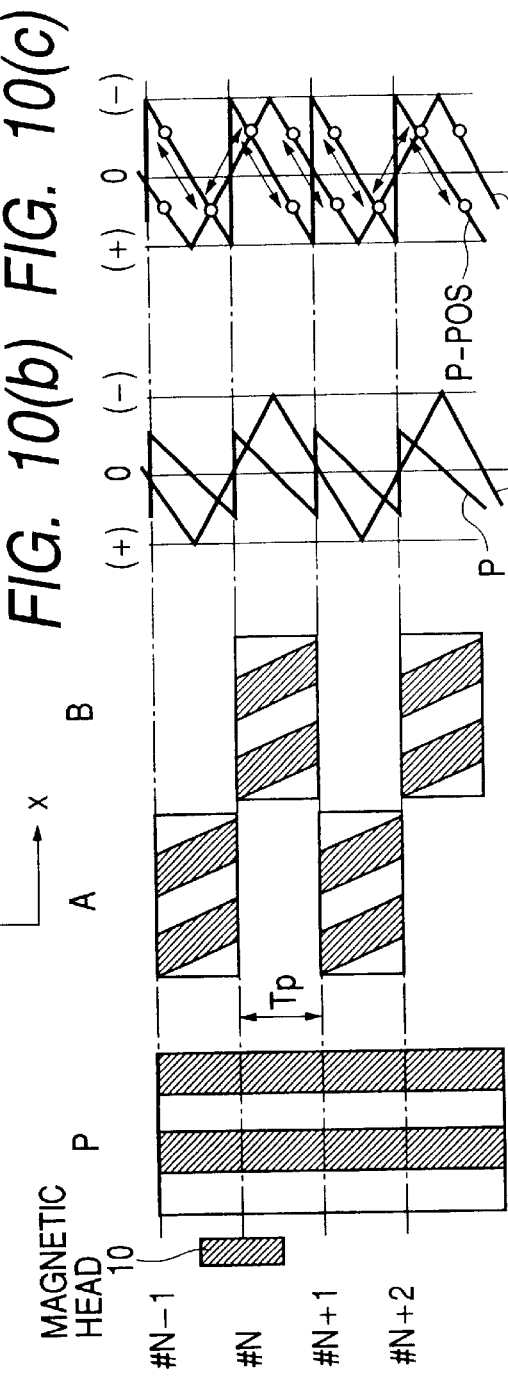
FIGS. 10(*a*) to 10(*d*) are diagrams illustrating a method for allocating the positional signal based on the information on the amplitude and the positional signal based on the information on the phase.

The amplitude value 83 and the phase value 84 ouputted from the servo signal decoder circuit shown in FIG. 8 and the amplitude value 91 and the phase value 92 ouputted from the servo signal decoder circuit shown in FIG. 9 represent the positional signal of a magnetic head (POS), respectively. By allocating the signal as required, a linear positional signal is obtained. The method of allocating the positional signal based on the information on the amplitude and the positional signal based on the information on the phase will be described with reference to FIGS. 10(a) to 10(d). The patterns P, A and B shown in FIG. 10(a) are the patterns which have already been described with reference to FIGS. 1(a), 3(a), 4(a) and 5(a). The results of decoding the reproduced signals of the patterns A and B by the servo signal decoder circuit shown in FIG. 8 or FIG. 9 are defined as $S_A$ and $S_B$ for amplitude decoding and $P_A$ and $P_B$ for phase decoding, respectively. In this case, the Q expressed by [EQUATION 13] and the P expressed by [EQUATION 14] are positional signals for the amplitude and the phase, respectively.

$$Q = S_A - S_B$$ [EQUATION 13]

$$P = P_A - P_B$$ [EQUATION 14]

The positional signals Q and P are expressed in the waveforms shown in FIG. 10(b). Next, the normalization signals of Q and P, Q-POS and P-POS, are calculated from the following [EQUATION 15] and [EQUATION 16], respectively. In the equations, w is a weight to balance the signal level between the amplitude and the phase.

$$Q\_POS = \frac{(1+w) \cdot Q}{|Q + w \cdot P|}$$ [EQUATION 15]

$$P\_POS = \frac{(1+w) \cdot P}{|Q + w \cdot P|}$$ [EQUATION 16]

The thus obtained Q-POS and P-POS are normalization positional signals. Straight-line portions of the signals (circled portions in FIG. 10(c) (ranges thereof are shown by arrows)) are taken and used as positional signals. Alternatively, the normalization signals may also be calculated from the following [EQUATION 17] and [EQUATION 18]. In the equations, n is a positive number.

$$Q\_POS = \frac{\sqrt[n]{1+w^n} \cdot Q}{\sqrt[n]{Q^n + w^n \cdot P^n}}$$ [EQUATION 17]

$$P\_POS = \frac{\sqrt[n]{1+w^n} \cdot P}{\sqrt[n]{Q^n + w^n \cdot P^n}}$$ [EQUATION 18]

Thus, by reproducing and decoding the amplitude signal and the phase signal and using them complementarily, a positional signal with good linearity can be obtained. That is, by decoding the servo pattern shown in FIG. 1(a) or FIG. 1(c), the servo pattern shown in FIG. 4(a) and the servo pattern shown in FIG. 5 with the servo signal decoder circuit of the present invention to acquire the information on the amplitude and the information on the phase, a positional signal with good linearity and excellent noise resistance can be obtained. Further, since linearity over the whole region can be guaranteed with the servo pattern comprising the patterns A and B as shown in FIG. 1(a) or the like when the information on the amplitude of the reproduced waveform and the information on the phase thereof are used complementarily, the patterns C and D as shown in FIG. 1(c) are not always needed. That is, according to the present invention, the exclusive area of the servo pattern can be reduced while linearity is guaranteed with the servo pattern comprising the patterns A and B. In other words, the proportion of data area can be increased, which contributes to an improvement in format efficiency.

Another example of the present invention will be described with reference to FIGS. 11(a) and 11(b). A description will be given to a method for predicting the deviation of a magnetic head over tracks, which is caused by the shock or vibration given to a magnetic disk drive from the outside thereof, from the decoded signal of a servo pattern.

FIG. 11(a) shows a servo pattern comprising the above-described patterns P, A and B and additional patterns A' and B' which are the same as the patterns A and B. The positional signal of a magnetic head can be produced by the above-described method using the patterns P, A and B. Assume that the orbit of the magnetic head is shifted as shown by an arrow 111 by the influence of the vibration or shock given from the outside of the magnetic disk drive. In this case, a position shift amount of δ1 is produced between the position 112 at which the head position is calculated from the patterns A and B and the position 113 at which the head position is calculated from the patterns A' and B'. Since this position shift amount is observed by the positional signals decoded by the patterns A and B and the patterns A' and B' and the time required to move from the position 112 to the position 113 is known, the orientation and size of the vector of the orbit 111 can be calculated.

FIG. 11(b) represents a method by which the same effect as achieved by the method of FIG. 11(a) is achieved by using the pattern configuration different from that shown in FIG. 11(a). The pattern shown in FIG. 11(b) comprises the above-described patterns P, A and B and additional patterns R1 and R2. A and R1 on a track and R1, B and R2 on the track represent the same pattern, respectively, and R1 and R2 are continuous patterns in the track-width direction. The positional signal can be produced by the above-described method using the patterns P, A and B. Particularly, the positional signal based on the phase pattern can be produced also by using P and R1.

Assume that the orbit of the magnetic head is shifted as shown by an arrow 114 by the influence of the vibration or shock given from the outside of the magnetic disk drive. In this case, a position shift amount of δ2 is produced between the position 115 at which the head position is calculated from the patterns P and R1 and the position 116 at which the head position is calculated from the patterns P and R2. Since this position shift amount is observed by the positional signals decoded by the patterns P and R1 and the patterns P and R2 and the time required to move from the position 115 to the position 116 is known, the orientation and size of the vector of the orbit 114 can be calculated.

When the velocity vector in the head-moving direction is found by the method described with reference to FIG. 11(a) or FIG. 11(b), it becomes possible to estimate whether the head is on a given track, at the data position before the next servo sector. Such an estimate is necessary to avoid the possibility of destroying the data on adjacent tracks when the shock or vibration from the outside occurs during a writing process. When it is estimated that the position of the head within the data area is not on the target track, the corruption of the data can be prevented beforehand, for example, by preventing the writing process. That is, such an estimate contributes to an improvement in reliability of the magnetic disk drive.

Figure 12:
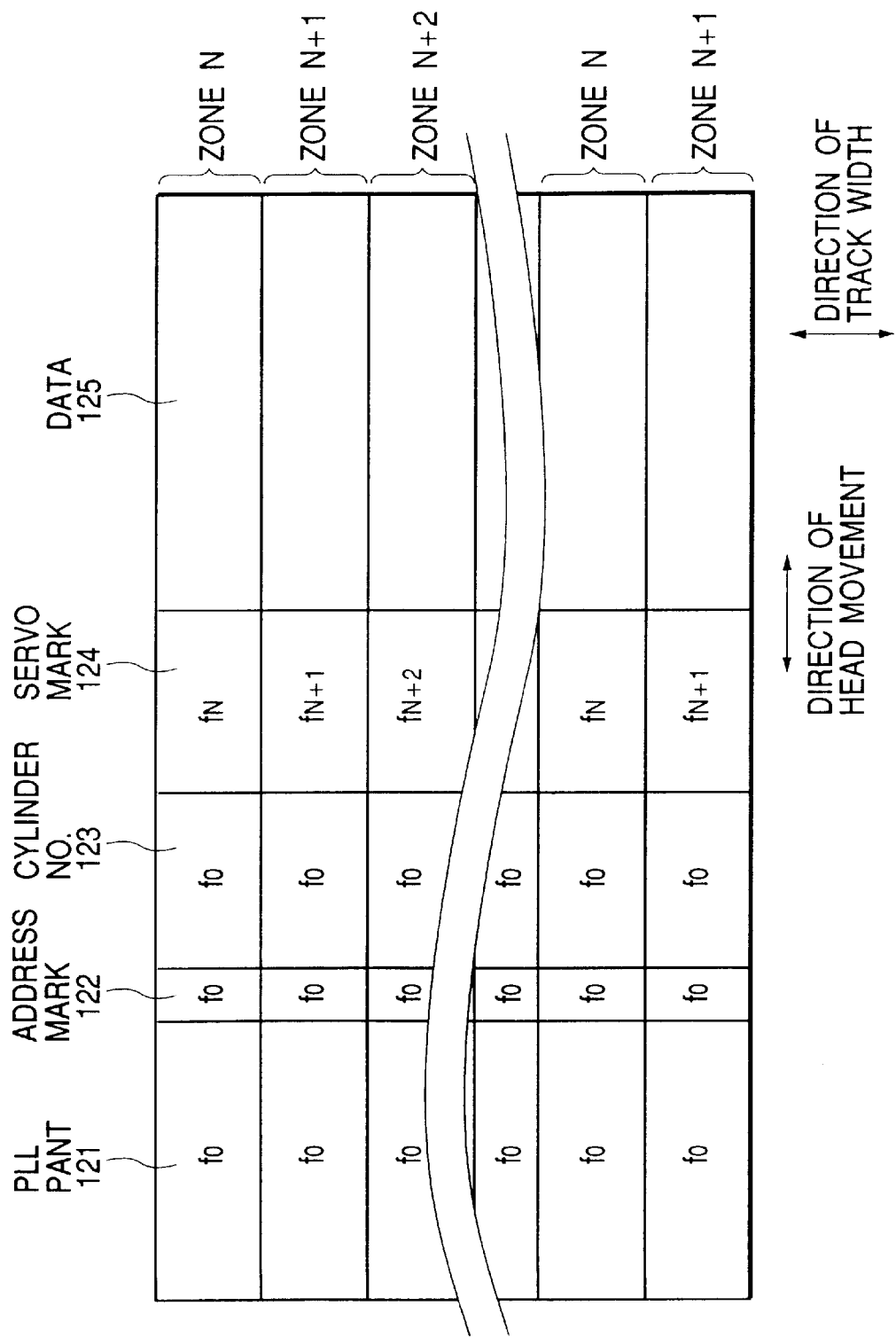
FIG. 12 is a diagram showing a format structure of the case where the recording frequency of a servo mark is caused to vary from one zone to another.

FIG. 12 illustrates still another example of the present invention. FIG. 12 is a schematic diagram showing the format structure of the information on the servo pattern and the data area according to the present invention. The horizontal direction of FIG. 12 is a reading-writing direction, while the vertical direction is a track-width direction. As an example of the format structure of the information on the servo pattern, a PLL part 121, an address mark (AM) 122, a cylinder number 123, the servo mark 124 according to the present invention which has been described so far and data 125 together form a servo sector, and a repetition of the servo sector forms a track. The number of repetitions of the servo sector is about 50 to 150.

A zone N includes several hundreds to several thousands of the above track collectively. From the inner diameter of the disk to the outer diameter thereof, the number of zones is about 5 to 30. The recording frequencies of the patterns in the PLL part 121, the address mark (AM) 122 and the cylinder number 123 in each zone are all the same at $f_0$. On the other hand, the recording frequencies of the servo marks 124 of the zones N, N+1, N+2, . . . are all different. As for the information on the recording frequency of the servo mark 124, for example, by storing a table in advance, which provides the sampling frequency in each zone corresponding to the cylinder number 123, in a ROM and the like and carrying out sampling at a predetermined sampling frequency on the cylinder to which the magnetic head makes access, the difference in recoding frequency from one zone to another can be accommodated.

Desirably, the zones close to the outer diameter have higher recording frequencies, while the zones close to the inner diameter have lower recording frequencies. More desirably, the recording frequency is determined based on the following concept. Depending on the recording capabilities of the head and the medium, the reproduced waveform of the pattern recorded by longitudinal recording represents an isolated signal having a narrow half-value width (value of PW50) when the recording density is relatively low. As the recording density increases along with an increase in recording frequency, the waveform gradually becomes close to a sinusoidal waveform. Examining the frequency spectrum of the waveform, a number of harmonic contents of the second or higher order are observed in addition to the fundamental wave content. Meanwhile, at the time of decoding the waveform of the positional signal, for the purpose of reducing noises at high and low frequencies, only the frequencies in the vicinity of the fundamental wave are generally filtered to cut the harmonic contents. Thus, the selection of a recording frequency which undergoes little harmonic content cutting and has good energy efficiency is desired, and the value of the frequency is such that the recording period (reciprocal of recording frequency) of the waveform is about three times the half-value width (value of PW50) when an isolated signal is recorded (IEEE Transaction on Magnetics, 32-5, pp. 3899–3901(1996)). Therefore, the recoding frequency of each zone should be selected such that the recording period (reciprocal of recording frequency) of the waveform should be about three times the half-value width (value of PW50) when an isolated signal is recorded in each zone. According to this method, the decoded waveform of the servo signal can be obtained at the highest energy efficiency, the good quality of the positional signal can be maintained, and, in the end, positioning accuracy can be improved. The above concept may be applied not only to a zone but also to a track.

Figure 13A:
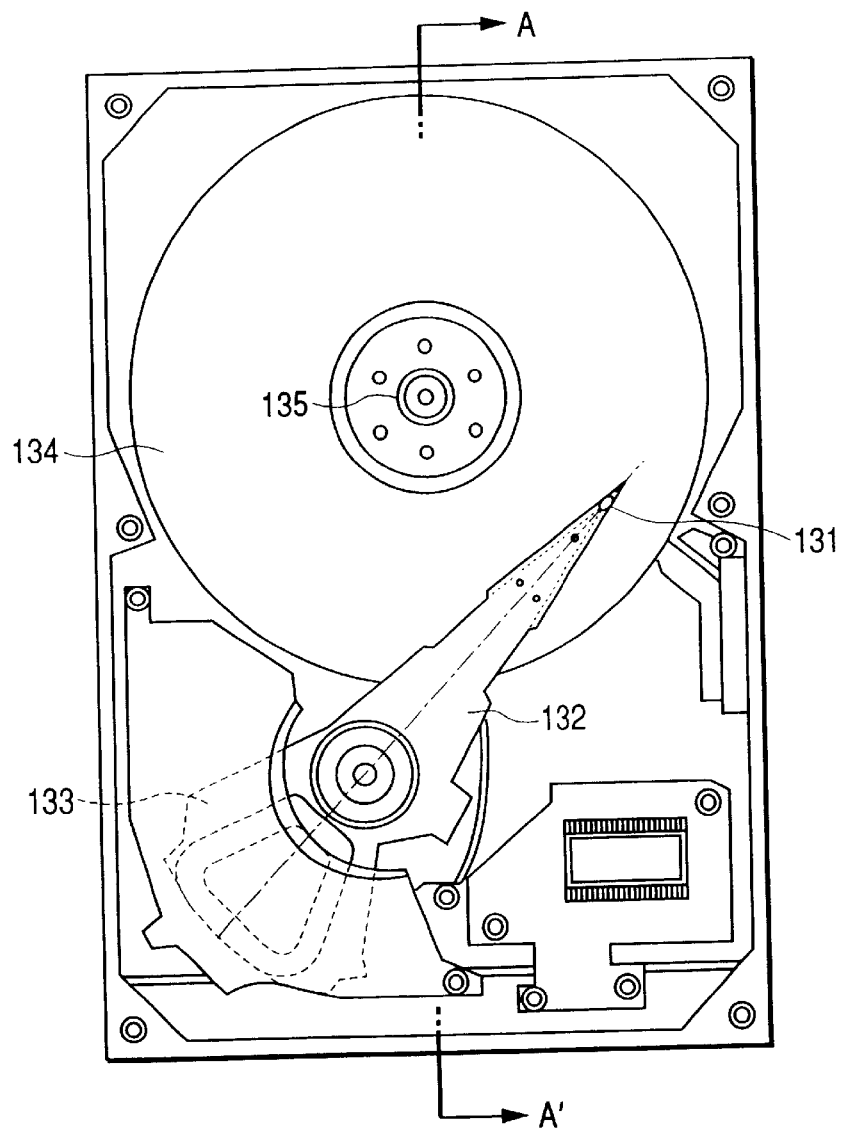
FIGS. 13(a) and 13(b) are schematic diagrams of the magnetic disk unit according to the present invention.
Figure 13B:
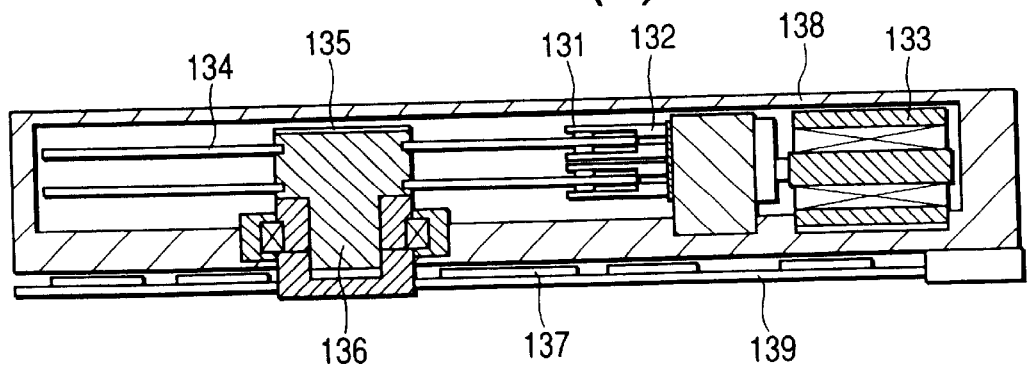

Next, an example of the magnetic disk drive according to the present invention and an internal circuit thereof will be described with reference to FIGS. 13(a), 13(b) and 14. FIG. 13(a) is a schematic plan view of the magnetic disk drive according to the present invention, and FIG. 13(b) is a schematic sectional view of FIG. 13(a) at the line A–A'. A magnetic head 131 is driven by a head actuator 133 having a voice-coil-motor (VCM) installed therein, via an arm 132. Meanwhile, a magnetic disk 134 is driven by a spindle motor 136 via a disk spindle 135. The above components are mounted on a base 137 and sealed by a cover 138. Further, recording and reproduction, control thereof, position control of the magnetic head, power control, and input and output of data, control signals, power and the like are performed by circuits mounted on a circuit board 139.

FIG. 14 is a schematic functional block diagram illustrating the function of the above internal circuit. The inputs and the outputs of information on magnetic data 1311, a control signal 1312, information on address 1313, information on status 1314 and power 1315 are controlled by an interface unit 1301. The information on magnetic data 1311 is inputted to and outputted from a recording/reproduction circuit 1302. the control signal 1312 is inputted to and outputted from a controller 1303. The information on address 1313 and the information on status 1314 are inputted to and outputted from a head positioning circuit 1304. The power 1315 is inputted to and outputted from a power controller 1305. The spindle and the above circuits are. driven (1316 and 1317) by the power supplied from the power controller 1305, and the head actuator is driven on the basis of the information on servo 1318 from the head positioning circuit 1304. Information on recording/reproduction 1319 is sent back and forth between the recording/reproduction circuit 1302 and a magnetic disk 1306 via a magnetic head 1307. Information on position and velocity 1320 by the method of positioning according to the present invention is converted to the information on servo 1318 at the head positioning circuit 1304, and information on control 1321 is sent to the controller to be used for controlling the recording/reproduction circuit 1302.

According to the present invention, there are provided a method and a device which exhibit better performance against factors inhibiting an increase in track density such as non-linearity of a positional signal, a reduction in signal-to-noise ratio (S/N) and deterioration of resistance to disturbance, all of which start to appear along with an increase in the track density of a magnetic disk drive, and which can contribute to an increase in the storage capacity of the magnetic disk drive.

What is claimed is:

1. A magnetic disk drive comprising:
   a magnetic recording medium having a servo pattern;
   a magnetic head that writes information on and reads the information from the magnetic recording medium; and
   a servo signal decoder circuit that decodes a positional signal of the magnetic head from a reproduced signal of the servo pattern,
   wherein the reproduced signal of the servo pattern is sinusoidal,
   wherein said servo signal decoder circuit comprises:
      an A/D converter which converts the reproduced signal from analog to digital,
      means for sampling a signal from said A/D converter, at a sampling frequency which is determined based on the waveform of the signal to be sampled, and
      means for calculating a Fourier coefficient of the sampled signal,
   wherein said servo signal decoder circuit decodes the amplitude and phase of the positional signal based on the Fourier coefficient of the sampled signal,
   wherein said servo pattern includes a plurality of patterns arranged on both sides of a center line of each of plural tracks,
   wherein patterns on one side of the center line are shifted in a track direction from patterns on the other side of the center line,
   wherein each of the plurality of patterns includes a plurality of phase patterns arranged in a track-width direction,
   wherein the number of types of the phase patterns is N (where N is a positive number of at least 2, and
   wherein patterns on one side of the center line have the same frequency and patterns on the other side of the center line have the same frequency which has a phase different from a phase of the frequency of the patterns on the one side of the center line.

2. A magnetic disk drive according to claim 1, wherein the servo signal decoder circuit determines the amplitude of each partial signal by integrating the partial signal and its phase from the phase of a sinusoidal function of the sampled signal.

3. A magnetic disk drive according to claim 1, wherein the servo signal decoder circuit determines the amplitude and the phase of each partial signal from the amplitude and the phase of a sinusoidal function of the sampled signal.

4. A magnetic disk drive according to claim 1, wherein the servo signal decoder circuit decodes the positional signal of the magnetic disk by weighing the amplitude and the phase of the positional signal differently.

5. A magnetic disk drive according to claim 1, wherein a velocity vector of the magnetic head is determined by using positional signals of the magnetic head which are at two distinct positions away from each other at a given distance in a track direction.

6. A magnetic disk drive according to claim 1, wherein a frequency of the reproduced signal of the servo pattern varies from one zone to another, and the servo signal decoder circuit decodes the positional signal of the magnetic head by determining a sinusoidal function, which roughly agrees with each of a plurality of partial signals, based on information on the frequency of the reproduced signal of the servo pattern which has been read out of each zone.

7. A magnetic disk drive according to claim 1, wherein said servo signal decoder circuit carries out at least one of:
   determining the Fourier coefficient A1 and B1 of a reproduced signal, and
   determining a phase value of the reproduced signal by calculating an arctangent of B1/A1,
   wherein said A1 is a cosine term of the first order Fourier coefficient and said B1 is a sine term of the first order Fourier coefficient.

8. A magnetic disk drive according to claim 7, wherein said servo signal decoder circuit further carries out determining an amplitude value of said reproduced servo signal by calculating a square root of the whole quantity of said A1 squared plus said B1 squared.

9. A magnetic disk drive according to claim 8, wherein said servo signal decoder circuit determines a positional signal of magnetic head by using said phase value and said amplitude value.

10. A magnetic disk drive comprising:
    a magnetic recording medium having a servo pattern;
    a magnetic head that writes information on and reads the information from the magnetic recording medium; and
    a servo signal decoder circuit that decodes a positional signal of the magnetic head from a reproduced signal of the servo pattern,
    wherein the reproduced signal of the servo pattern is sinusoidal, wherein said servo signal decoder circuit comprises:
an A/D converter which converts the reproduced signal from analog to digital,
means for sampling a signal from said A/D converter, at a sampling frequency which is determined based on the waveform of the signal to be sampled, and
means for calculating a Fourier coefficient of the sampled signal,
wherein said servo signal decoder circuit decodes the amplitude and phase of the positional signal based on the Fourier coefficient of the sampled signal,
wherein said servo pattern includes a plurality of patterns arranged on both sides of a center line of each of plural tracks,
wherein patterns on one side of the center line are shifted in a track direction from patterns on the other side of the center line,
wherein each pattern is a pattern whose phase in the track direction changes continuously in a track-width direction, and
wherein patterns on one side of the center line have the same frequency and patterns on the other side of the center line have the same frequency which has a phase different from a phase of the frequency of the patterns on the one side of the center line.

11. A magnetic disk drive according to claim 10, wherein the servo signal decoder circuit determines the amplitude of each partial signal by integrating the partial signal and its phase from the phase of a sinusoidal function of the sampled signal.

12. A magnetic disk drive according to claim 10, wherein the servo signal decoder circuit determines the amplitude and the phase of each partial signal from the amplitude and the phase of a sinusoidal function of the sampled signal.

13. A magnetic disk drive according to claim 10, wherein the servo signal decoder circuit decodes the positional signal of the magnetic disk by weighing the amplitude and the phase of the positional signal differently.

14. A magnetic disk drive according to claim 10, wherein a velocity vector of the magnetic head is determined by using positional signals of the magnetic head which are at two distinct positions away from each other at a given distance in a track direction.

15. A magnetic disk drive according to claim 10, wherein a frequency of the reproduced signal of the servo pattern varies from one zone to another, and the servo signal decoder circuit decodes the positional signal of the magnetic head by determining a sinusoidal function, which roughly agrees with each of a plurality of partial signals, based on information on the frequency of the reproduced signal of the servo pattern which has been read out of each zone.

16. A magnetic disk drive according to claim 10, wherein said servo signal decoder circuit carries out at least one of:
determining the Fourier coefficient A1 and B1 of a reproduced signal, and
determining a phase value of the reproduced signals by calculating an arctangent of B1/A1,
wherein said A1 is a cosine term of the first order Fourier coefficient and said B1 is a sine term of the first order Fourier coefficient.

17. A magnetic disk drive according to claim 16, wherein said servo signal decoder circuit further carries out calculating an amplitude of said reproduced servo signal by calculating a square root of the whole quantity of said A1 squared plus said B1 squared.

18. A magnetic disk drive according to claim 17, wherein said servo signal decoder circuit determines a positional error signal using said arctangent of B1/A1 and said amplitude of reproduced servo signal.

* * * * *